United States Patent
Yu et al.

(10) Patent No.: US 10,853,636 B2
(45) Date of Patent: Dec. 1, 2020

(54) INFORMATION PROCESSING APPARATUS, METHOD, AND NON-TRANSITORY COMPUTER-READABLE STORAGE MEDIUM

(71) Applicant: FUJITSU LIMITED, Kawasaki (JP)

(72) Inventors: Shanshan Yu, Kawasaki (JP); Norihiro Kakuko, Kawasaki (JP); Takeshi Otani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 151 days.

(21) Appl. No.: 15/980,835

(22) Filed: May 16, 2018

(65) Prior Publication Data

US 2018/0336403 A1   Nov. 22, 2018

(30) Foreign Application Priority Data

May 19, 2017 (JP) ................ 2017-099792

(51) Int. Cl.
*G06K 9/46* (2006.01)
*G06K 9/00* (2006.01)
*G06T 7/246* (2017.01)
*G06T 7/00* (2017.01)
*G06F 3/01* (2006.01)

(52) U.S. Cl.
CPC .......... *G06K 9/00369* (2013.01); *G06F 3/01* (2013.01); *G06K 9/00342* (2013.01); *G06T 7/246* (2017.01); *G06T 7/97* (2017.01); *G06T 2207/10016* (2013.01); *G06T 2207/30196* (2013.01)

(58) Field of Classification Search
CPC ............ G06K 9/00369; G06K 9/00342; G06T 7/246; G06T 7/97; G06T 2207/10016; G06T 2207/30196; G06F 3/01
See application file for complete search history.

(56) References Cited

U.S. PATENT DOCUMENTS

| | | | | |
|---|---|---|---|---|
| 7,340,100 | B2 * | 3/2008 | Higaki | ............ G06F 3/017 382/199 |
| 7,821,531 | B2 * | 10/2010 | Yoda | ............ G06F 3/017 348/143 |

(Continued)

FOREIGN PATENT DOCUMENTS

| | | |
|---|---|---|
| JP | 2000-180162 | 6/2000 |
| JP | 2007-257459 | 10/2007 |
| JP | 2016-4354 | 1/2016 |

OTHER PUBLICATIONS

Extended European Search Report dated Sep. 17, 2018 for corresponding European Patent Application No. 18172602.7, 8 pages.

(Continued)

*Primary Examiner* — Gregory M Desire
(74) *Attorney, Agent, or Firm* — Fujitsu Patent Center

(57) ABSTRACT

An information processing apparatus includes a memory, and a processor coupled to the memory and configured to obtain a plurality of images of a subject captured at different timings, detect a feature point of the subject from each of the plurality of images, identify a movement locus of the feature point between the plurality of images, identify a center position of a circle having the movement locus as an arc, and determine a posture of the subject based on the identified center position.

18 Claims, 16 Drawing Sheets

(56) References Cited

U.S. PATENT DOCUMENTS

| | | | | |
|---|---|---|---|---|
| 8,135,209 B2* | 3/2012 | Ikeda | ............ | G06T 7/75 |
| | | | | 382/103 |
| 8,615,136 B2* | 12/2013 | Chen | ............ | G06K 9/00335 |
| | | | | 382/201 |
| 8,878,922 B2* | 11/2014 | Anabuki | ............ | H04N 7/144 |
| | | | | 348/77 |
| 9,131,149 B2* | 9/2015 | Ohashi | ............ | H04N 5/23219 |
| 9,870,622 B1* | 1/2018 | Lu | ............ | G16H 20/30 |
| 10,445,566 B2* | 10/2019 | Sashida | ............ | G06K 9/00369 |
| 2009/0027337 A1 | 1/2009 | Hildreth | | |
| 2011/0317871 A1 | 12/2011 | Tossell et al. | | |
| 2014/0270351 A1 | 9/2014 | Hoof et al. | | |
| 2018/0251031 A1* | 9/2018 | Liebau | ............ | G06K 9/00845 |
| 2018/0336403 A1* | 11/2018 | Yu | ............ | G06K 9/00369 |

OTHER PUBLICATIONS

European Office Action dated May 3, 2019 for corresponding European Patent Application No. 18172602.7, 5 pages.

EPOA—Official Communication of European Patent Application No. 18172602.7 dated Nov. 19, 2019.

European Summons to attend oral proceeding dated Sep. 11, 2020 for corresponding European Patent Application No. 18172602.7, 6 pages. *Please note D1:US20110317871 and D2:US20090027337 cited herewith, were previously cited in an IDS filed on Oct. 30, 2018.*.

* cited by examiner

FIG. 3

| DETERMINATION RESULT INFORMATION 300 ||||
|---|---|---|---|
| TIME | FRAME NUMBER | PRESENCE OR ABSENCE OF SUBJECT | POSTURE DETERMINATION RESULT |
| ... | ... | ... | ... |
| $t_1$ | $f_1$ | PRESENCE | STANDING |
| $t_2$ | $f_2$ | PRESENCE | STANDING |
| $t_3$ | $f_3$ | PRESENCE | FORWARD LEANING |
| $t_4$ | $f_4$ | PRESENCE | STANDING |
| $t_5$ | $f_5$ | PRESENCE | STANDING |
| ... | ... | ... | ... |

FIG. 5A

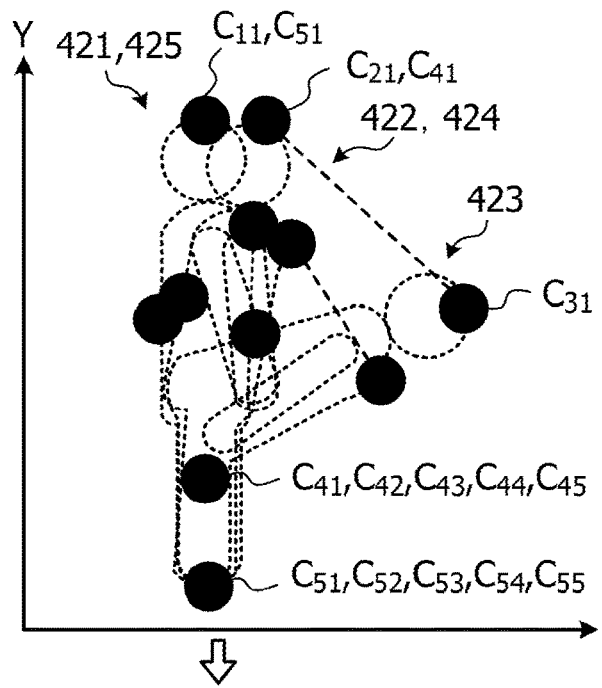

FIG. 5B (EXPRESSION 1)
CENTER COORDINATES= $(a_i, b_i)$, RADIUS OF CIRCLE= $r_i$ → $(x_{ij} - a_i)^2 + (y_{ij} - b_i)^2 = r_i^2$

WHEN COORDINATES = $(x_{ij}, y_{ij})$ OF $C_{11}, C_{21}, C_{31}, C_{41}, C_{51}$ ARE SUBSTITUTED INTO EXPRESSION 1, $$\begin{pmatrix} A \\ B \\ C \end{pmatrix} = \begin{pmatrix} \sum x_{ij}^2 & \sum x_{ij}y_{ij} & \sum x_{ij} \\ \sum x_{ij}y_{ij} & \sum y_{ij}^2 & \sum y_{ij} \\ \sum x_{ij} & \sum y_{ij} & \sum 1 \end{pmatrix}$$ (EXPRESSION 2)

WHERE
$A = -2a_i$
$B = -2b_i$
$C = a_i^2 + b_i^2 - r_i^2$ (EXPRESSION 3)

FIG. 5C

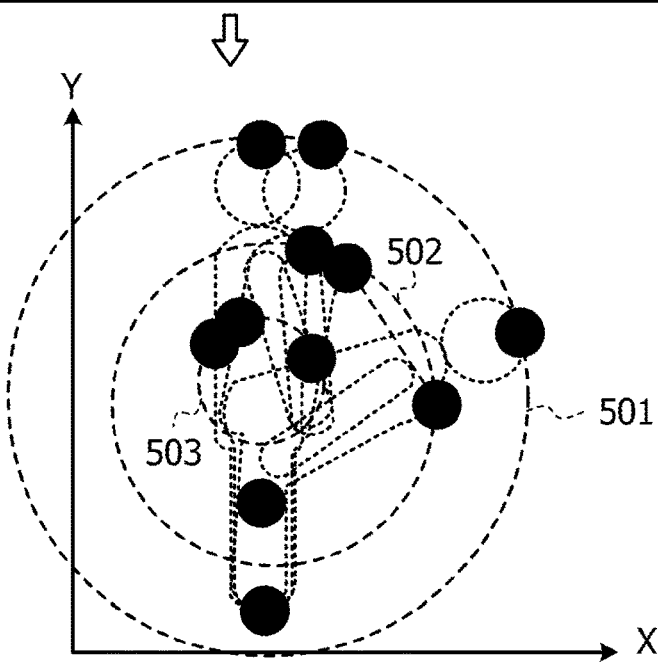

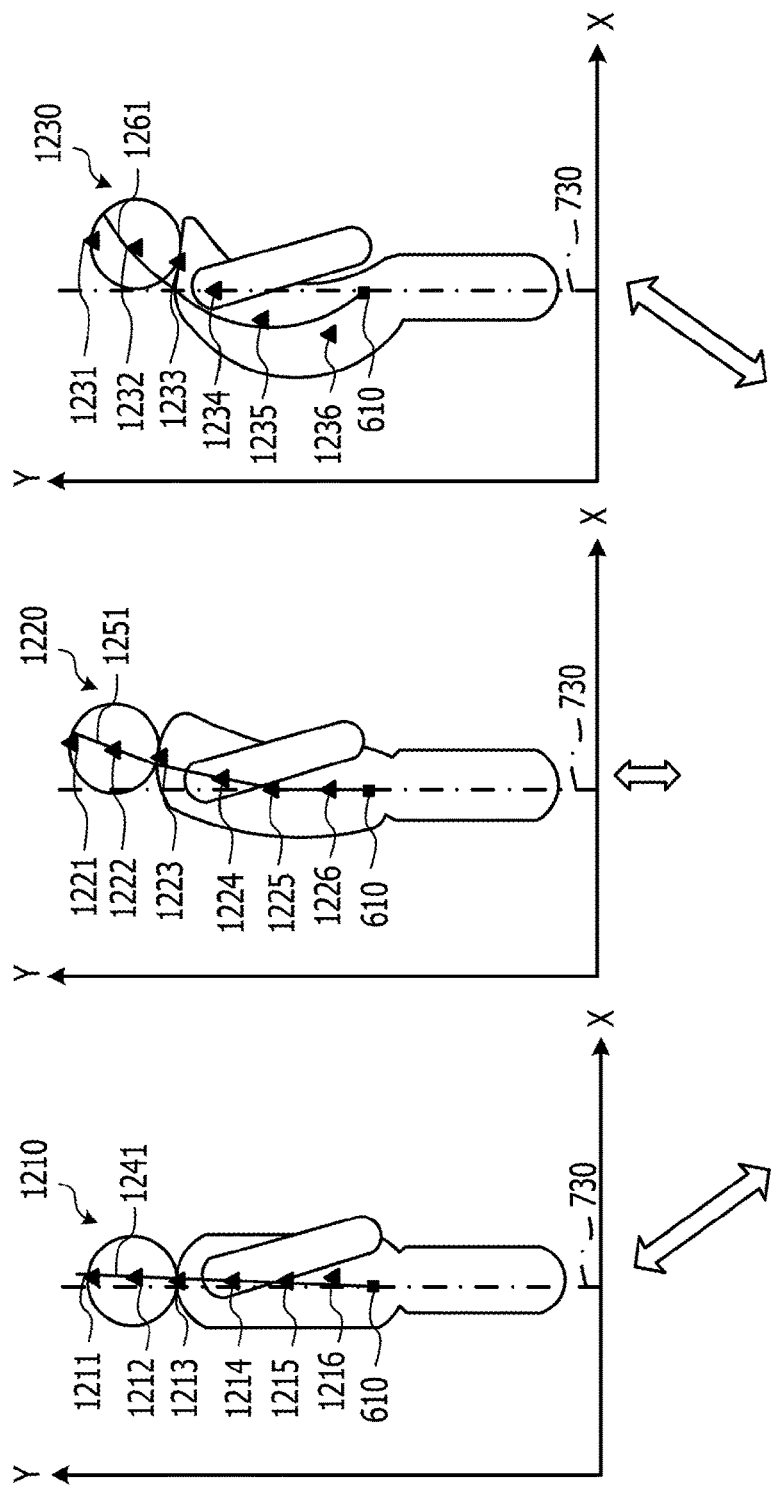

INFORMATION PROCESSING APPARATUS, METHOD, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-99792, filed on May 19, 2017, the entire contents of which are incorporated herein by reference.

FIELD

The embodiments discussed herein are related to an information processing apparatus, a method and a non-transitory computer-readable storage medium.

BACKGROUND

In a conventionally known posture determination technique, an image area corresponding to the body of a person is detected from a captured image, and the posture (such as a forward leaning posture, a standing posture) of the person is determined. For instance, Japanese Laid-open Patent Publication No. 2007-257459 discloses a technique that detects a pedestrian from an image captured by an imaging apparatus mounted on a vehicle, determines whether or not the pedestrian is in a forward leaning posture by calculating an inclination of the trunk axis of the detected pedestrian, and provides a determination result to the driver of the vehicle. Related technique is disclosed in Japanese Laid-open Patent Publication No. 2007-257459

SUMMARY

According to an aspect of the invention, an information processing apparatus includes a memory, and a processor coupled to the memory and configured to obtain a plurality of images of a subject captured at different timings, detect a feature point of the subject from each of the plurality of images, identify a movement locus of the feature point between the plurality of images, identify a center position of a circle having the movement locus as an arc, and determine a posture of the subject based on the identified center position.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a table illustrating an example of determination result information;

FIGS. 5A, 5B, and 5C are figures and expressions illustrating a specific example of processing until circles are calculated by the posture determination unit;

FIGS. 12A and 12B are a chart illustrating a specific example of processing of determining a state of a person performed by the posture determination unit;

DESCRIPTION OF EMBODIMENTS

In the case of posture determination technique, an inclination of the trunk axis of a person is calculated based on a line passing through a lowest point (for instance, the heel of the person) of a detected image area. For this reason, although when the entire body of a person is leaning, the posture of the person may be determined, for instance, when only the upper half of the body is leaning, it is difficult to determine the posture of the person with high accuracy, and application to other utilization scenes is limited.

For instance, it is difficult to apply the above-mentioned posture determination technique to a situation in which a posture is determined when a customer gets interested in a product in a store and leans forwardly or when a store clerk bows.

In an aspect, the disclosure provides a technique capable of determining the posture of a person from a captured image.

Hereinafter, embodiments will be described with reference to the accompanying drawings. It is to be noted that in the description and the drawings, components having substantially the same functional configuration are labeled with the same symbol, and a redundant description is omitted.

First Embodiment

<System Configuration of Posture Determination System>

Figure 1:
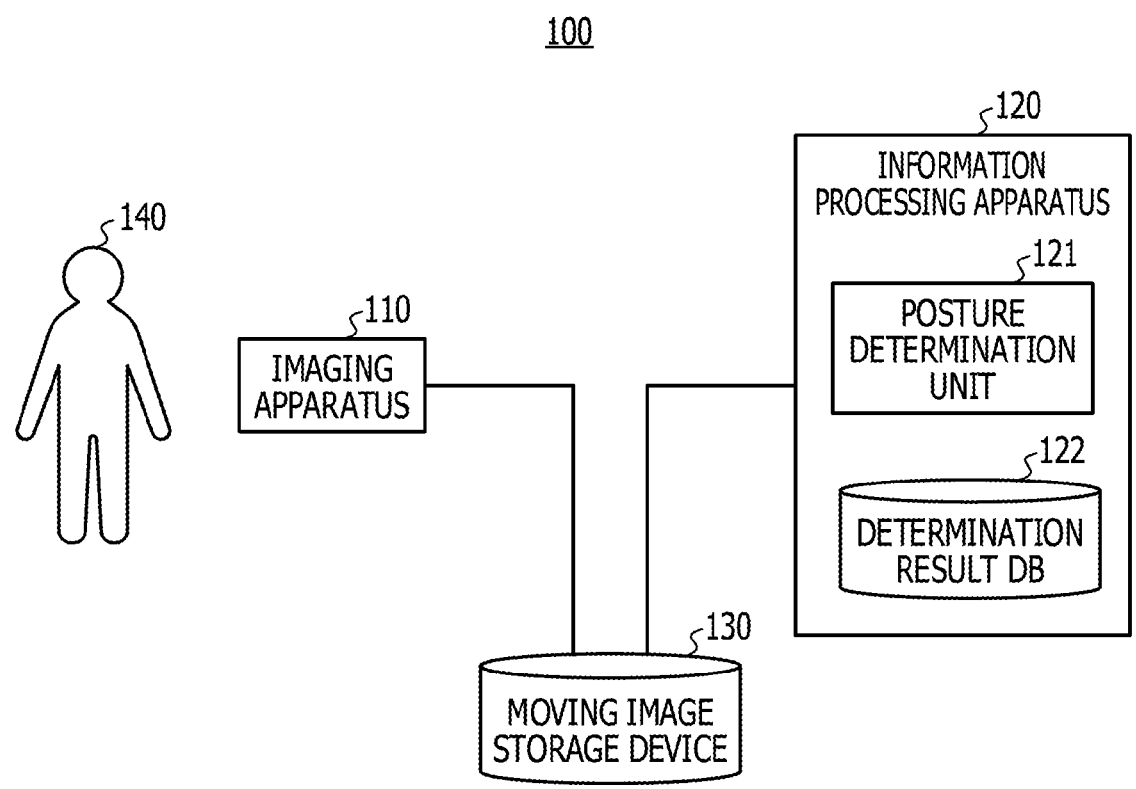
FIG. 1 is a first diagram illustrating an example system configuration of a posture determination system.

First, the system configuration of a posture determination system will be described, which detects a person as the subject from a captured moving image, and determines the posture of the person. FIG. 1 is a diagram illustrating an example system configuration of the posture determination system.

As illustrated in FIG. 1, the posture determination system has an imaging apparatus 110, a moving image storage apparatus 130, and an information processing apparatus 120.

The imaging apparatus 110 captures an image of a person 140 as the subject. The imaging apparatus 110 is coupled to the moving image storage apparatus 130, and transmits a captured moving image to the moving image storage apparatus 130. The moving image storage apparatus 130 stores a moving image transmitted from the imaging apparatus 110.

The information processing apparatus 120 is an example of a posture determination apparatus, and is coupled to the moving image storage apparatus 130. The information processing apparatus 120 has a posture determination program installed, and serves as a posture determination unit 121 by executing the program.

The posture determination unit 121 reads a moving image from the moving image storage apparatus 130, and detects a person 140 contained in a captured image (hereinafter referred to as image data) in each of frames of the moving image. In addition, the posture determination unit 121 determines a posture (for instance, a forward leaning posture, a backward leaning posture, or a standing posture) of the detected person 140, and stores a posture determination result in a determination result database (hereinafter abbreviated as DB) 122.

<Hardware Configuration of Information Processing Apparatus>

Figure 2:
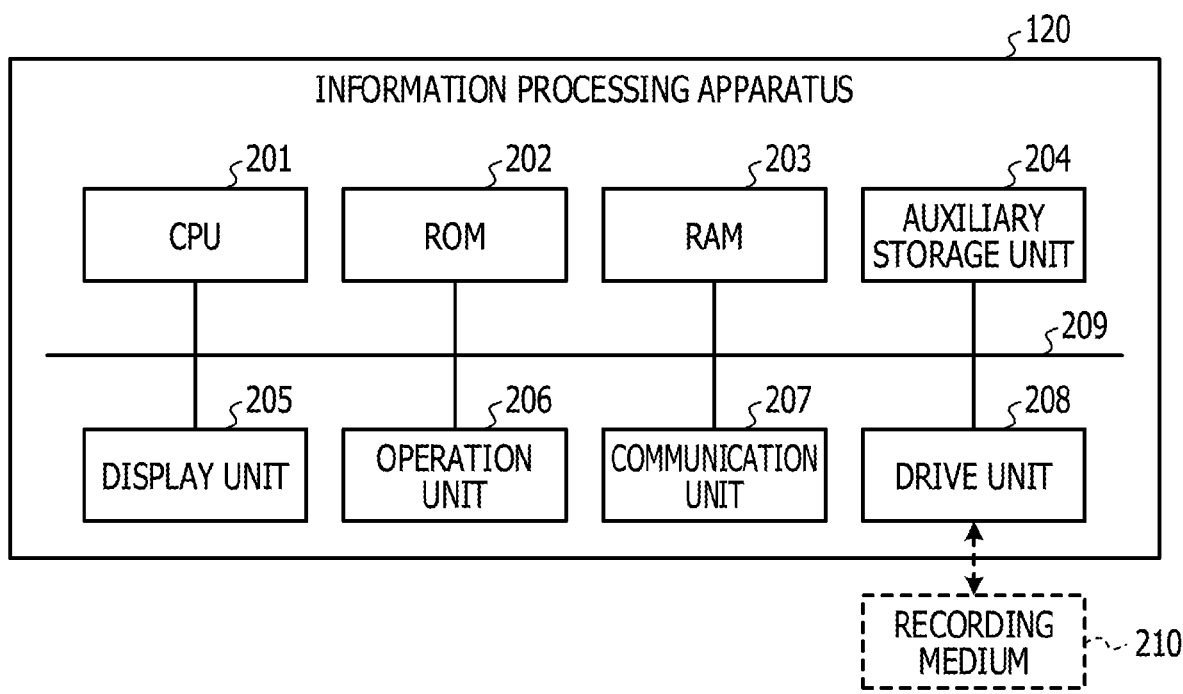
FIG. 2 is a diagram illustrating an example hardware configuration of an information processing apparatus.

Next, the hardware configuration of the information processing apparatus 120 will be described. FIG. 2 is a diagram illustrating an example hardware configuration of the information processing apparatus.

As illustrated in FIG. 2, the information processing apparatus 120 has a central processing unit (CPU) 201, a read only memory (ROM) 202, and a random access memory (RAM) 203. The CPU 201, the ROM 202, and the RAM 203 form what is called a computer. In addition, the information processing apparatus 120 has an auxiliary storage unit 204, a display unit 205, an operation unit 206, a communication unit 207, and a drive unit 208. Each unit of information processing apparatus 120 is mutually coupled through bus 209.

CPU 201 executes the various programs (for instance, posture determination program etc.) installed in auxiliary storage unit 204.

The ROM 202 is a non-volatile memory. The ROM 202 serves as a main memory device that stores various programs and data desirably used by the CPU 201 to execute various programs installed in the auxiliary storage unit 204. Specifically, the ROM 202 stores a boot program of a basic input/output system (BIOS) and an extensible firmware interface (EFI).

The RAM 203 is a volatile memory such as a dynamic random access memory (DRAM) and a static random access memory (SRAM). The RAM 203 serves as a main memory device that provides a work space for loading various programs installed in the auxiliary storage unit 204 when the programs are executed by the CPU 201.

The auxiliary storage unit 204 is an auxiliary storage device that stores various programs installed in the information processing apparatus 120, and data generated by executing the various programs. It is to be noted that the determination result DB 122 is implemented in the auxiliary storage unit 204.

The display unit 205 is a display device that displays an internal state of the information processing apparatus 120. The operation unit 206 is an operation device that is used when various instructions to the information processing apparatus 120 are inputted by an administrator of the posture determination system 100. The communication unit 207 is a communication device used by the information processing apparatus 120 for communicating with the moving image storage device 130.

The drive unit 208 is a device for setting a recording medium 210. The recording medium 210 referred to herein includes a medium, which records information optically, electrically or magnetically, such as a CD-ROM, a flexible disk, and a magneto-optical disk. Alternatively, the recording medium 210 may include a semiconductor memory, which records information electrically, such as a ROM, and a flash memory.

It is to be noted that various programs stored in the auxiliary storage unit 204 are installed, for instance, by setting a distributed recording medium 210 in the drive unit 208, and reading various programs recorded on the recording medium 210 by the drive unit 208. Alternatively, various programs stored in the auxiliary storage unit 204 may be installed by being downloaded from a network via the communication unit 207.

<Determination Result DB>

Next, determination result information stored in the determination result DB 122 will be described. FIG. 3 is a table illustrating an example of the determination result information.

As illustrated in FIG. 3, determination result information 300 includes "time", "frame number", "presence or absence of subject", and "posture determination result" as items of information.

The "time" stores imaging times (for instance, $t_1$ to $t_5$) when image data in the frames of a moving image is captured. The "frame number" stores identifiers (for instance, $f_1$ to $f_5$) assigned to image data in the frames of a moving image. The "presence or absence of subject" stores a detection result (presence or absence) indicating whether or not a person as the subject has been detected from the image data of a corresponding frame. It is to be noted that "absence" is assumed be stored in the "presence or absence of subject" as the default.

The "posture determination result" stores a result of determination (one of standing, forward leaning, and backward leaning) as to the posture of a person as the subject detected from the image data of a corresponding frame.

It is to be noted that the order of determination when the posture of a person is determined by the posture determination unit 121 is not limited to the order of capturing the image data in the frames. For instance, after determining the posture of a detected person to be "forward leaning" in a frame, the posture determination unit 121 determines the posture of the person in the image data in the previous and subsequent frames.

<Specific Example of Processing of Posture Determination Unit>

Next, a specific example of processing performed by the posture determination unit 121 will be described.

(1) Specific Example of Processing Until Movement Locus of Feature Point Is Calculated by Posture Determination Unit.

Figure 4:
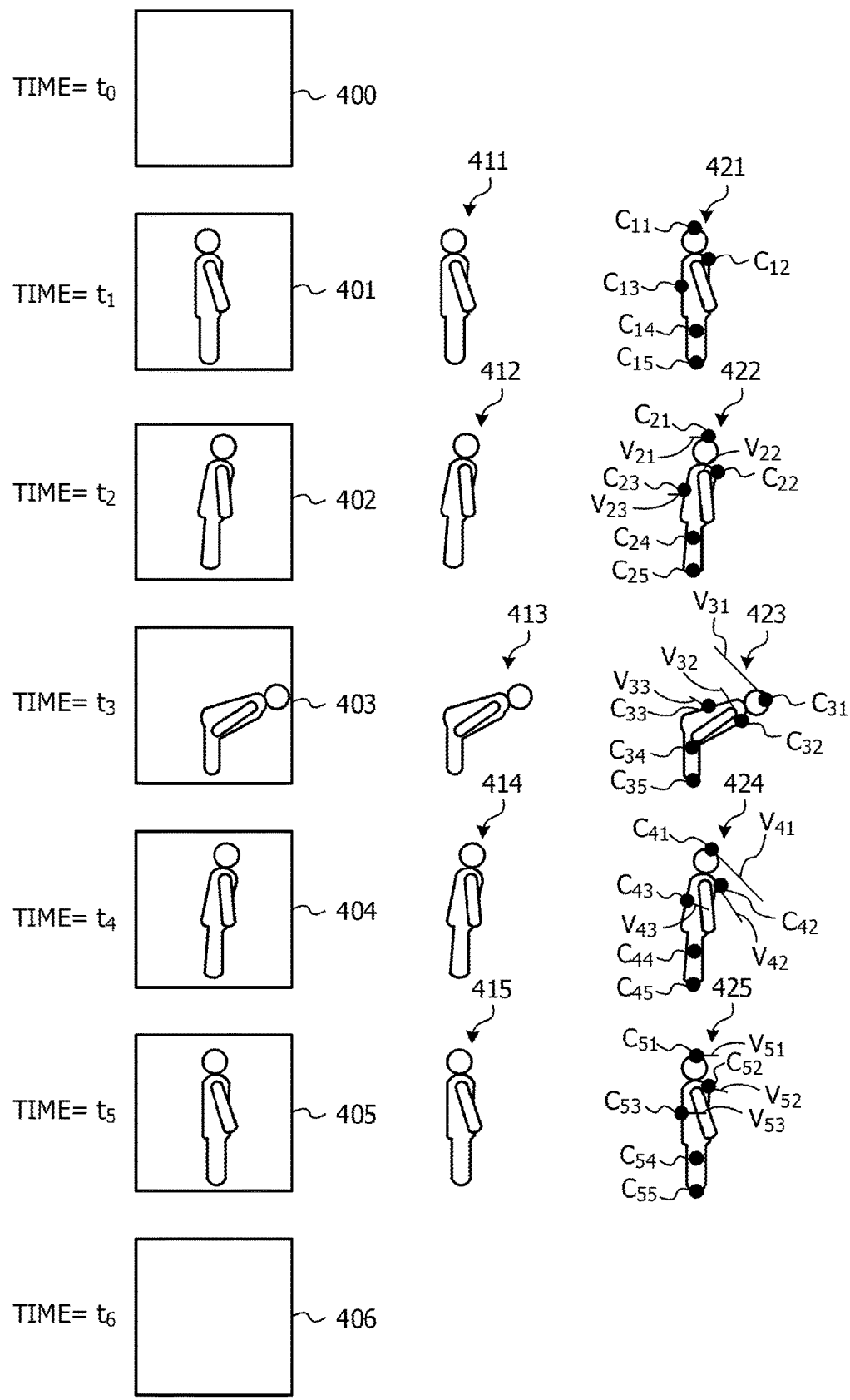
FIG. 4 is a chart illustrating a specific example of processing until a locus of a feature point is calculated by a posture determination unit.

First, a specific example of processing performed by the posture determination unit 121 will be described, the processing including detecting feature points from an image area corresponding to the body of the person 140, and calculating a movement locus (hereinafter simply referred to as a locus) of each of the feature points between pieces of image data in frames. FIG. 4 is a chart illustrating a specific example of processing until a locus of a feature point is calculated by the posture determination unit.

In FIG. 4, image data 400 to 406 in frames are the image data in the frames captured at time $t_0$ to time $t_6$ among the frames included in a moving image read from the moving image storage apparatus 130. It is to be noted that the example of FIG. 4 indicates that the person 140 as the subject is out of the imaging range at time $t_0$. Also, the example of FIG. 4 indicates that the person 140 as the subject moved into the imaging range at time $t_1$, and was detected from the image data between time $t_1$ and time $t_5$ both inclusive. In addition, the example of FIG. 4 indicates that the person 140 as the subject moved out from the imaging range again at time $t_6$.

Also, in FIG. 4, body area images 411 to 415 indicate the image areas corresponding to the body of the person 140 detected from the image data 401 to 405 in the frames including the person 140 among the image data 400 to 406 in the frames.

Also, in FIG. 4, feature point images 421 to 425 are images generated by superimposing feature points $C_{11}$ to $C_{15}$, feature points $C_{21}$ to $C_{25}$, and . . . feature points $C_{51}$ to $C_{55}$ detected from the body area images 411 to 415 on the body area images 411 to 415, respectively. It is to be noted that the feature points $C_{11}$ to $C_{15}$, the feature points $C_{21}$ to $C_{25}$, and . . . the feature points $C_{51}$ to $C_{55}$ are the feature points in the same or similar motion pattern, detected from the body area images 411 to 415.

In addition in FIG. 4, locus data $V_{21}$, $V_{22}$, and . . . $V_{53}$ illustrated in the feature point images 421 to 425 indicate the locus of each feature point between pieces of image data in the frames. For instance, the locus data $V_{21}$ indicates a locus of the feature point $C_{11}$ which was moving to the feature point $C_{21}$ between the image data 401 and the image data 402. In this manner, locus data may be calculated, which indicates a locus of each feature point between pieces of image data in the frames by associating a feature point with a corresponding feature point between the pieces of image data in the frames.

(2) Specific Example of Processing Until Circle is Calculated by Posture Determination Unit Next, a specific example of processing will be described, which is performed until a circle having each locus as an arc is calculated by the posture determination unit 121 based on the locus of each feature point between pieces of image data in the frames. FIGS. 5A, 5B, and 5C are figures and expressions illustrating a specific example of processing until circles are calculated by the posture determination unit.

Among these, FIG. 5A illustrates the manner in which a two-dimensional space is defined with the horizontal axis as the X-axis and the vertical axis as the Y-axis in order to identify the coordinates of each position in each image data, and the feature point images 421 to 425 are superimposed on the two-dimensional space. When the person 140 leans forwardly the upper body between time $t_1$ to time $t_5$ both inclusive, as illustrated in FIG. 5A, the locus between corresponding feature points each forms a circle with a center in the vicinity of the waist of the person 140.

Here, let ($a_i$, $b_i$) be the center coordinates of the circle having the locus (locus data $V_{21}$, $V_{22}$, and $V_{53}$) through corresponding feature points $C_{11}$, $C_{21}$, $C_{31}$, $C_{41}$, $C_{51}$ as arcs, and $r_i$ be the radius of the circle. In this situation, the coordinates ($x_{ij}$, $y_{ij}$) of the feature points $C_{11}$, $C_{21}$, $C_{31}$, $C_{41}$, $C_{51}$ satisfy Expression 1.

$$(x_{ij}-a_i)^2 + (y_{ij}-b_i)^2 = r_i^2 \quad \text{(Expression 1)}$$

When Expression 1 is expanded, and expressed by using determinants, Expression 2 is obtained.

$$\begin{pmatrix} A \\ B \\ C \end{pmatrix} = \begin{pmatrix} \sum x_{ij}^2 & \sum x_{ij}y_{ij} & \sum x_{ij} \\ \sum x_{ij}y_{ij} & \sum y_{ij}^2 & \sum y_{ij} \\ \sum x_{ij} & \sum y_{ij} & \sum 1 \end{pmatrix} \quad \text{(Expression 2)}$$

It is to be noted that in Expression 2, A, B, and C satisfy Expression 3 below.

$$\left. \begin{array}{l} A = -2a_i \\ B = -2b_i \\ C = a_i^2 + b_i^2 - r_i^2 \end{array} \right\} \quad \text{(Expression 3)}$$

Consequently, as illustrated in FIG. 5C, a circle 501 having the radius $r_1$ and the locus (locus data $V_{21}$, $V_{31}$, $V_{41}$, and $V_{51}$) through the feature points $C_{11}$, $C_{21}$, $C_{31}$, $C_{41}$, and $C_{51}$ as arcs is calculable. Also, by performing similar processing, a circle 502 having the radius $r_2$ and the locus (locus data $V_{22}$, $V_{32}$, $V_{42}$, and $V_{52}$) through the feature points $C_{12}$, $C_{22}$, $C_{32}$, $C_{42}$, and $C_{52}$ as arcs is calculable. In addition, a circle 503 having the radius r3 and the locus (locus data $V_{23}$, $V_{33}$, $V_{43}$, and $V_{53}$) through the feature points $C_{13}$, $C_{23}$, $C_{33}$, $C_{43}$, and $C_{53}$ as arcs is calculable.

In this manner, it is possible to identify which portion of the person 140 serves as the rotation center of a forward leaning posture or a backward leaning posture of the person 140 by calculating a circle having a locus of each feature point between pieces of image data in the frames as an arc.

It is to be noted that a circle is not calculated for the feature points $C_{41}$, $C_{42}$, $C_{43}$, $C_{44}$, and $C_{45}$ because those feature points moved very little between time $t_1$ to time $t_5$ both inclusive. Similarly, a circle is not calculated for the feature points $C_{51}$, $C_{52}$, $C_{53}$, $C_{54}$, and $C_{55}$ because those feature points moved very little between time $t_1$ to time $t_5$ both inclusive.

(3) Specific Example of Processing Until Rotation Center is Calculated by Posture Determination Unit Next, a specific example of processing will be described, which is performed until a rotation center of the forward leaning posture or backward leaning posture of the person 140 is identified based on the calculated circle by the posture determination unit 121.

Figure 6A:
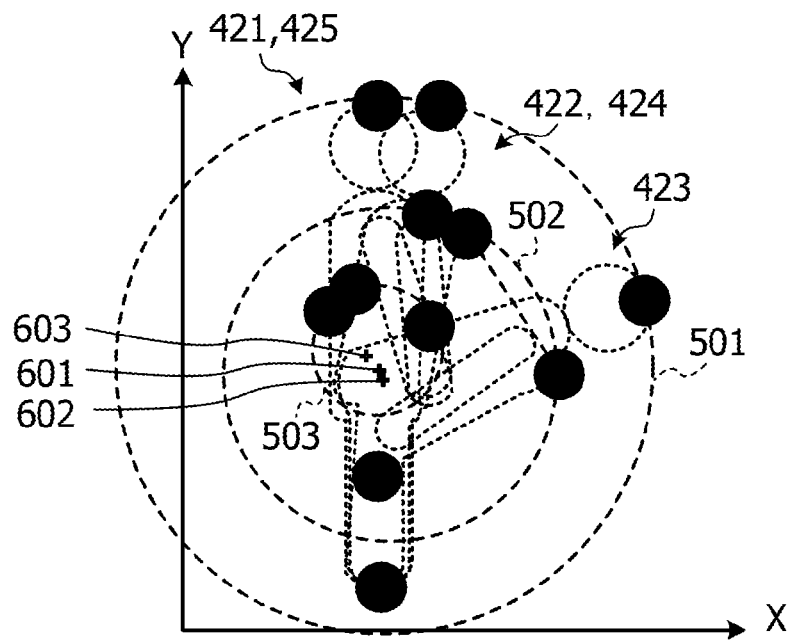
FIGS. 6A and 6B are figures illustrating a specific example of processing until rotation centers are identified by the posture determination unit.
Figure 6B:
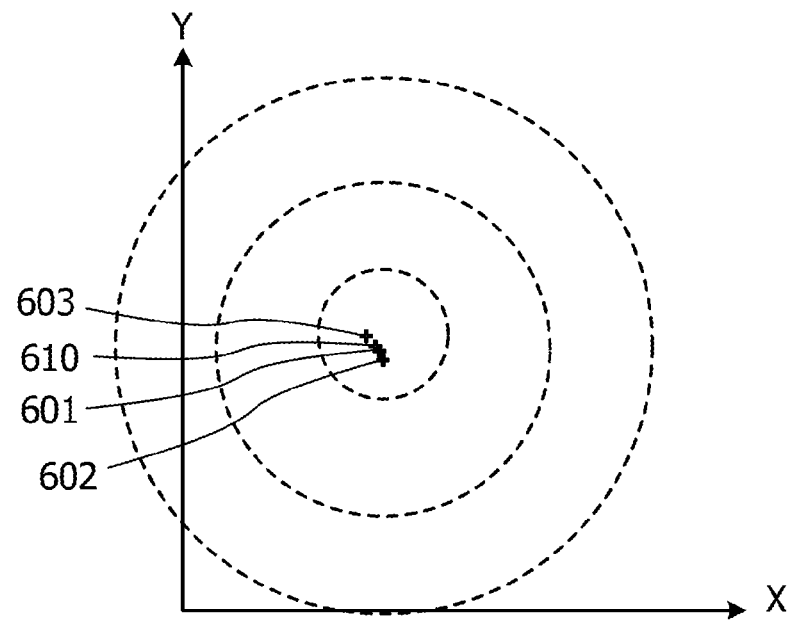

FIGS. 6A and 6B are figures illustrating a specific example of processing until rotation centers are identified by the posture determination unit. Among these, FIG. 6A illustrates the manner in which the feature point images 421 to 425 are superimposed and illustrated on a two-dimensional space with the horizontal axis as the X-axis and the vertical axis as the Y-axis, and the circles 501 to 503 and the respective centers 601 to 603 of the circles 501 to 503 are further superimposed on the two-dimensional space.

As illustrated in FIG. 6A, the circle centers 601 to 603 do not usually completely match. Thus, the posture determination unit 121 calculates the centroid position of the circle centers 601 to 603 as the rotation center of the forward leaning posture or backward leaning posture of the person 140.

FIG. 6B illustrates the manner in which a rotation center 610 is identified by calculating the centroid position of the circle centers 601 to 603. In this manner, multiple circle centers are calculated, and when the circle centers do not match, the posture determination unit 121 uniquely identifies the rotation center of the forward leaning posture or backward leaning posture of the person 140 by calculating the centroid position of the circle centers.

Figures 7A, 7B:
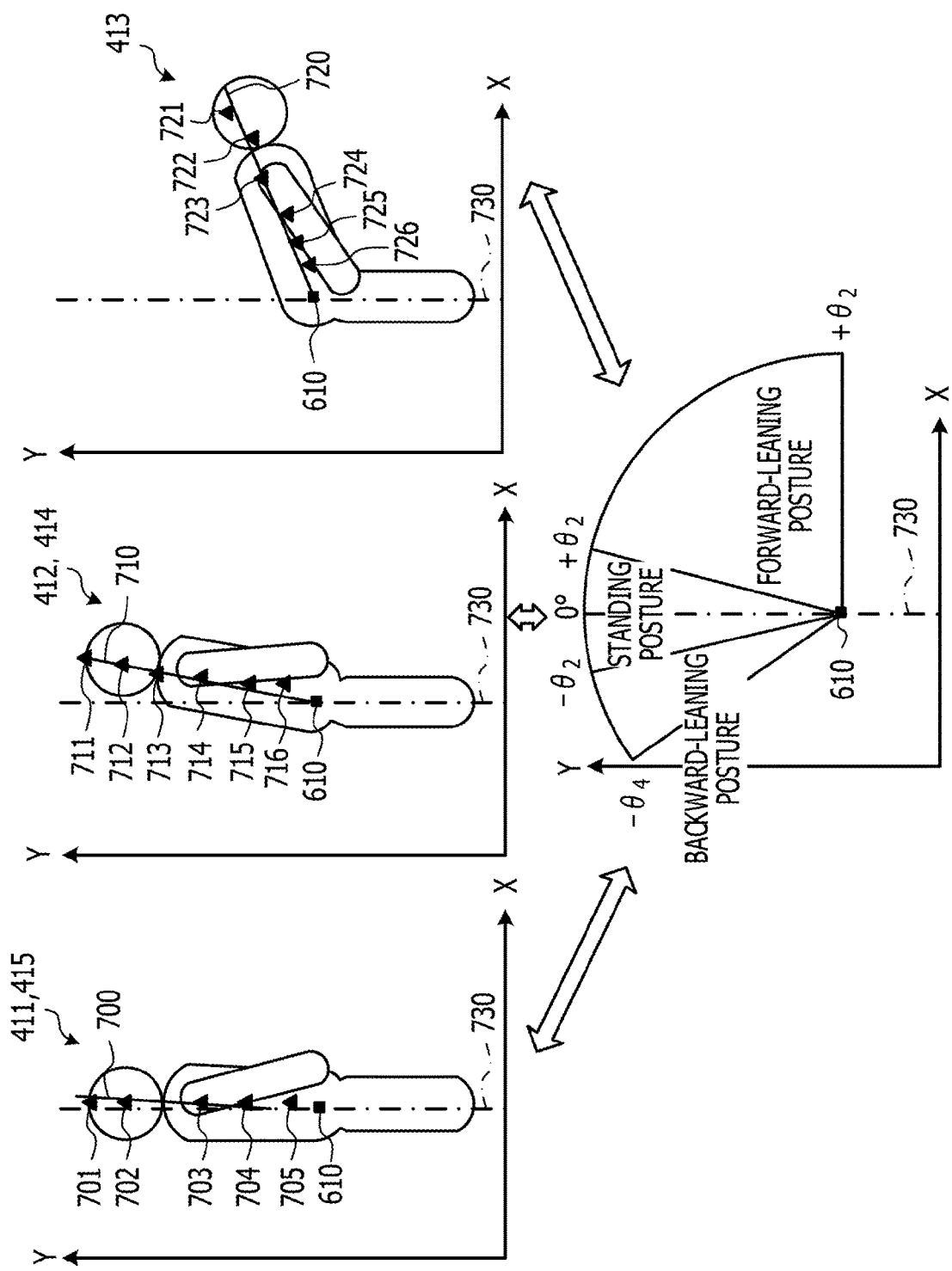
FIGS. 7A and 7B is a chart illustrating a specific example of processing until a posture is determined by the posture determination unit.

(4) Specific Example of Processing Until Posture is Determined by Posture Determination Unit Next, a specific example of processing will be described, which is performed until a posture (a forward leaning posture, a backward leaning posture, or a standing posture) of the person 140 is determined by the posture determination unit 121 based on the identified rotation center. FIGS. 7A and 7B are a chart illustrating a specific example of processing until a posture is determined by the posture determination unit.

Among these, FIG. 7A illustrates the manner in which a parameter (an inclination angle between the trunk axis and the vertical axis) used for determining the posture of the person 140 by disposing the body area image 411 and other images at times $t_1$ to $t_5$ in a two-dimensional space with the horizontal axis as the X-axis and the vertical axis as the Y-axis.

As illustrated in FIG. 7A, the posture determination unit 121 extracts body axis points 701 to 706 in the body area image 411 at time $t_1$ (or the body area image 415 at time $t_5$). The body axis points 701 to 706 are each a point (a point indicating the central position of the body area image in a thickness direction) that is located above the rotation center 610, and located in the center of the body area image 411 (or the body area image 415). The posture determination unit 121 calculates a line 700, as a trunk axis, which passes through the rotation center 610, and approximates the body axis points 701 to 706. In other words, it may be stated that the trunk axis is an approximate line of gravity of the person 140 obtained by approximating the body axis points in the area located above the rotation center in the body area image.

Similarly, the posture determination unit 121 extracts body axis points 711 to 716 in the body area image 412 at time $t_2$ (or the body area image 414 at time $t_4$). In addition, the posture determination unit 121 calculates a line 710, as a trunk axis, which passes through the rotation center 610, and approximates the body axis points 711 to 716.

Similarly, the posture determination unit 121 extracts body axis points 721 to 726 in the body area image 413 at time $t_2$. In addition, the posture determination unit 121 calculates a line 720, as a trunk axis, which passes through the rotation center 610, and approximates the body axis points 721 to 726.

FIG. 7B is a chart illustrating a determination method of determining a posture of the person 140, and illustrates a two-dimensional space with the horizontal axis as the X-axis and the vertical axis as the Y-axis. As illustrated in FIG. 7B, in the chart illustrating a determination method of determining a posture of the person 140, a dashed dotted line 730 (vertical axis) passing through the rotation center 610 is defined as 0°, the clockwise rotation direction around the rotation center 610 is defined as + direction, and the counterclockwise rotation direction is defined as − direction. In addition, the range of $-\theta_2$ to $+\theta_1$ is defined as the standing posture, the range of $+\theta_1$ to $+\theta_3$ is defined as the forward leaning posture, and the range of $-\theta_4$ to $-\theta_2$ is defined as the backward leaning posture.

The inclination angle between the line 700 (trunk axis) and the dashed dotted line 730 (vertical axis) in FIG. 7A is included in the range of $-\theta_2$ to $+\theta_1$, thus the posture determination unit 121 determines the posture of the person 140 at time $t_1$ (or time $t_5$) to be a standing posture. Similarly, the inclination angle between the line 710 (trunk axis) and the dashed dotted line 730 (vertical axis) in FIG. 7A is included in the range of $-\theta_2$ to $+\theta_1$, thus the posture determination unit 121 determines the posture of the person 140 at time $t_2$ (or time $t_4$) to be a standing posture.

On the other hand, the inclination angle between the line 720 (trunk axis) and the dashed dotted line 730 (vertical axis) in FIG. 7A is included in the range of $+\theta_1$ to $+\theta_3$, thus the posture determination unit 121 determines the posture of the person 140 at time $t_3$ to be a forward leaning posture.

In this manner, even when only the upper body of the person 140 leans forward or backward, it is possible to determine the posture of the person 140 with high accuracy by calculating the inclination angle of the trunk axis of the person 140 using the identified rotation center.

<Functional Configuration of Posture Determination Unit>

Figure 8:
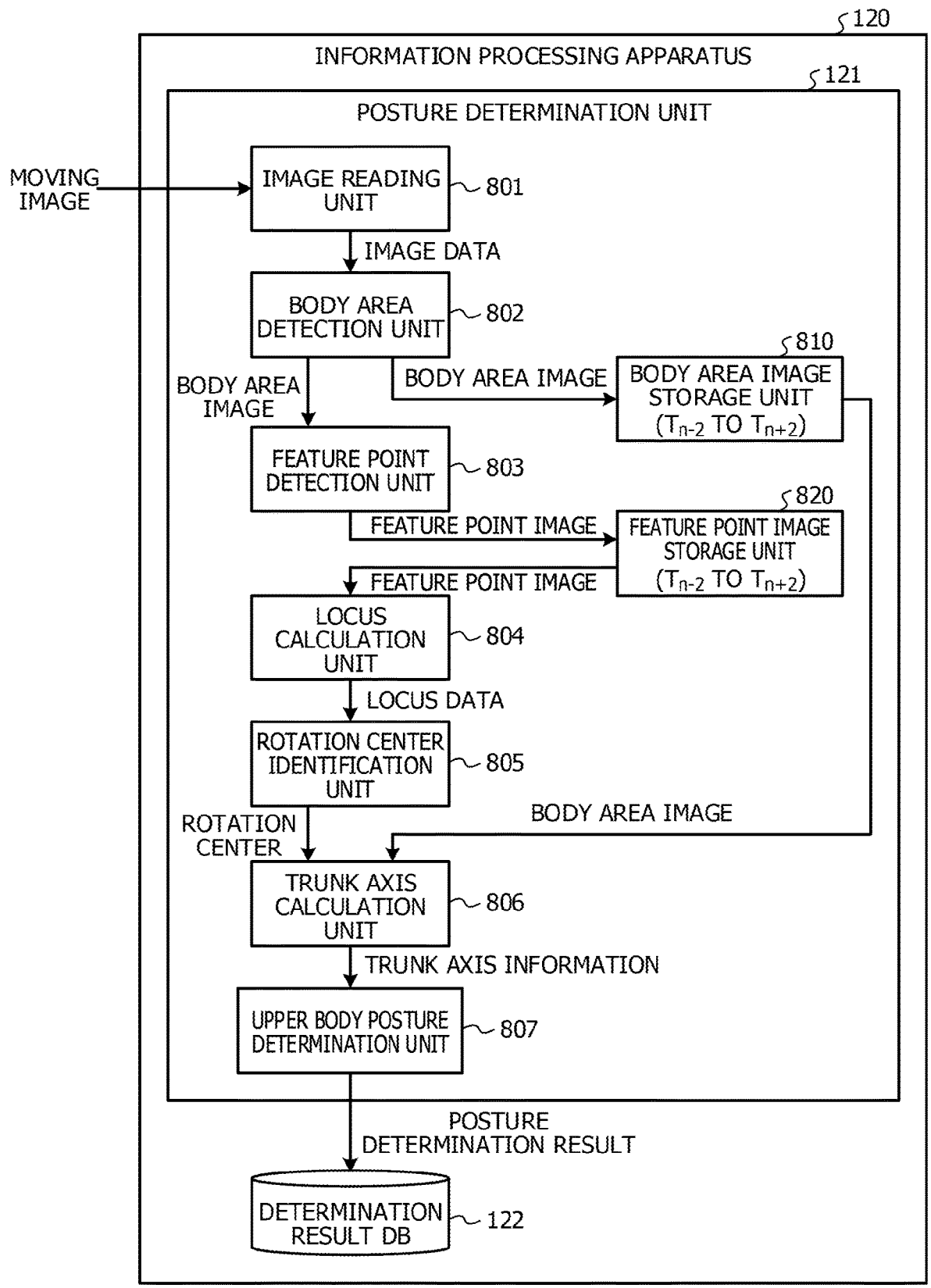
FIG. 8 is a first diagram illustrating an example functional configuration of the posture determination unit.

Next, the details of the functional configuration of the posture determination unit 121 will be described. FIG. 8 is a first diagram illustrating an example functional configuration of the posture determination unit. As illustrated in FIG. 8, the posture determination unit 121 has an image reading unit 801, a body area detection unit 802, a feature point detection unit 803, a locus calculation unit 804, a rotation center identification unit 805, a trunk axis calculation unit 806, and an upper body posture determination unit 807.

The image reading unit 801 reads a moving image stored in the moving image storage apparatus 130, and notifies the body area detection unit 802 of the image data of each frame.

The body area detection unit 802 detects a body area image of the person 140 from the image data notified from the image reading unit 801, and notifies the feature point detection unit 803 of the detected body area image. In addition, the body area detection unit 802 once stores the body area image in a body area image storage unit 810.

Here, it is assumed that the body area image to be processed is the body area image detected from the image data in the frame at time $t_n$. In this case, the body area image storage unit 810 stores the body area image detected from the image data in each frame between time $t_{n-2}$ and time $t_{n+2}$ both inclusive, for instance.

The feature point detection unit 803 detects feature points in the body area image to be processed, notified from the body area detection unit 802, and generates a feature point image by superimposing the feature points on the body area image. The feature point detection unit 803 once stores the feature point image generated based on the body area image to be processed into a feature point image storage unit 820. The feature point image storage unit 820 stores the feature point images generated based on the body area images stored in the body area image storage unit 810.

The locus calculation unit 804 reads each of the feature point images stored in the feature point image storage unit 820, and calculates the locus of each feature point. The locus calculation unit 804 uses, for instance, a feature point image generated based on the image data in the frame at time $t_{n-2}$, and a feature point image generated based on the image data in the frame at time $t_{n-1}$, and calculates the locus of each feature point between the pieces of image data in both frames. Hereinafter, similarly, the locus of each feature point is calculated between time $t_{n-1}$ and time $t_n$, between time $t_n$ and time $t_{n+1}$, and between time $t_{n+1}$ and time $t_{n+2}$. In this manner, the locus calculation unit 804 calculates the locus of each feature point between pieces of image data in the frames, and notifies the rotation center identification unit 805 of the locus as locus data.

The rotation center identification unit 805 is an example of an identification unit. The rotation center identification unit 805 calculates the center of each circle having each locus as an arc, based on the locus data notified from the locus calculation unit 804. When only one circle has each locus as an arc, the rotation center identification unit 805 identifies the center of the calculated circle as the rotation center, and notifies the trunk axis calculation unit 806 of the rotation center. In contrast, when multiple circles have each locus as an arc, the rotation center identification unit 805 calculates the centroid position from the centers of the calculated multiple circles, identifies the calculated centroid position as the rotation center, and notifies the trunk axis calculation unit 806 of the rotation center.

The trunk axis calculation unit 806 reads a body area image to be processed from the body area image storage unit 810, and extracts multiple body axis points. The trunk axis calculation unit 806 extracts multiple body axis points from a target area located above the rotation center notified from the rotation center identification unit 805.

Also, the trunk axis calculation unit 806 calculates a line, as a trunk axis, which passes through the rotation center notified from the rotation center identification unit 805, and approximates the extracted body axis points. The trunk axis calculation unit 806 notifies the upper body posture determination unit 807 of information (trunk axis information) indicating the calculated trunk axis.

The upper body posture determination unit 807 is an example of a determination unit, and determines the posture of the person 140 at time $t_0$ based on the trunk axis information notified from the trunk axis calculation unit 806, and stores a posture determination result in the determination result DB 122. At this point, the upper body posture determination unit 807 stores the result along with the presence or absence of subject="presence" in the determination result DB 122.

When the posture of the person 140 at time $t_0$ is determined to be a forward leaning posture or a backward leaning posture, and the posture of the person 140 at each of time $t_{n-2}$, time $t_{n-1}$, time $t_{n+1}$, and time $t_{n+2}$ is not determined, the upper body posture determination unit 807 notifies the trunk axis calculation unit 806 of a posture determination result. In this case, the trunk axis calculation unit 806 calculates respective trunk axes using the rotation center notified from the rotation center identification unit 805, and the body area image detected from the image data in the frame at each of time $t_{n-2}$, time $t_{n-1}$, time $t_{n+1}$, and time $t_{n+2}$. In addition, the trunk axis calculation unit 806 notifies the upper body posture determination unit 807 of the calculated trunk axes as the trunk axis information. Thus, the upper body posture determination unit 807 determines the posture of the person 140 at each of time $t_{n-2}$, time $t_{n-1}$, time $t_{n+1}$, and time $t_{n+2}$ based on the trunk axis information notified from the trunk axis calculation unit 806. Consequently, the upper body posture determination unit 807 may stores a posture determination result of the posture of the person 140 at each of time $t_{n-2}$, time $t_{n-1}$, time $t_{n+1}$, and time $t_{n+2}$ in the determination result DB 122 along with the presence or absence of subject.

A description will be given more specifically. For instance, when the person 140 is in a standing posture, the rotation center identification unit 805 may not be able to calculate a circle having each locus as an arc (in other words, a rotation center may not be identified). On the other hand, when the person 140 is in a forward leaning posture or a backward leaning posture, the rotation center identification unit 805 is able to calculate a circle having each locus as an arc (in other words, a rotation center may be identified).

Thus, when the posture of the person 140 is determined to be a forward leaning posture or a backward leaning posture, the upper body posture determination unit 807 notifies the trunk axis calculation unit 806 of a posture determination result. The trunk axis calculation unit 806 then calculates the trunk axis of the person 140 in the body area image detected from the image data in the frames at the previous and subsequent times. Consequently, the upper body posture determination unit 807 is able to determine the posture of the person 140 at the previous and subsequent times.

<Flow of Upper Body Posture Determination Processing>

Figure 9:
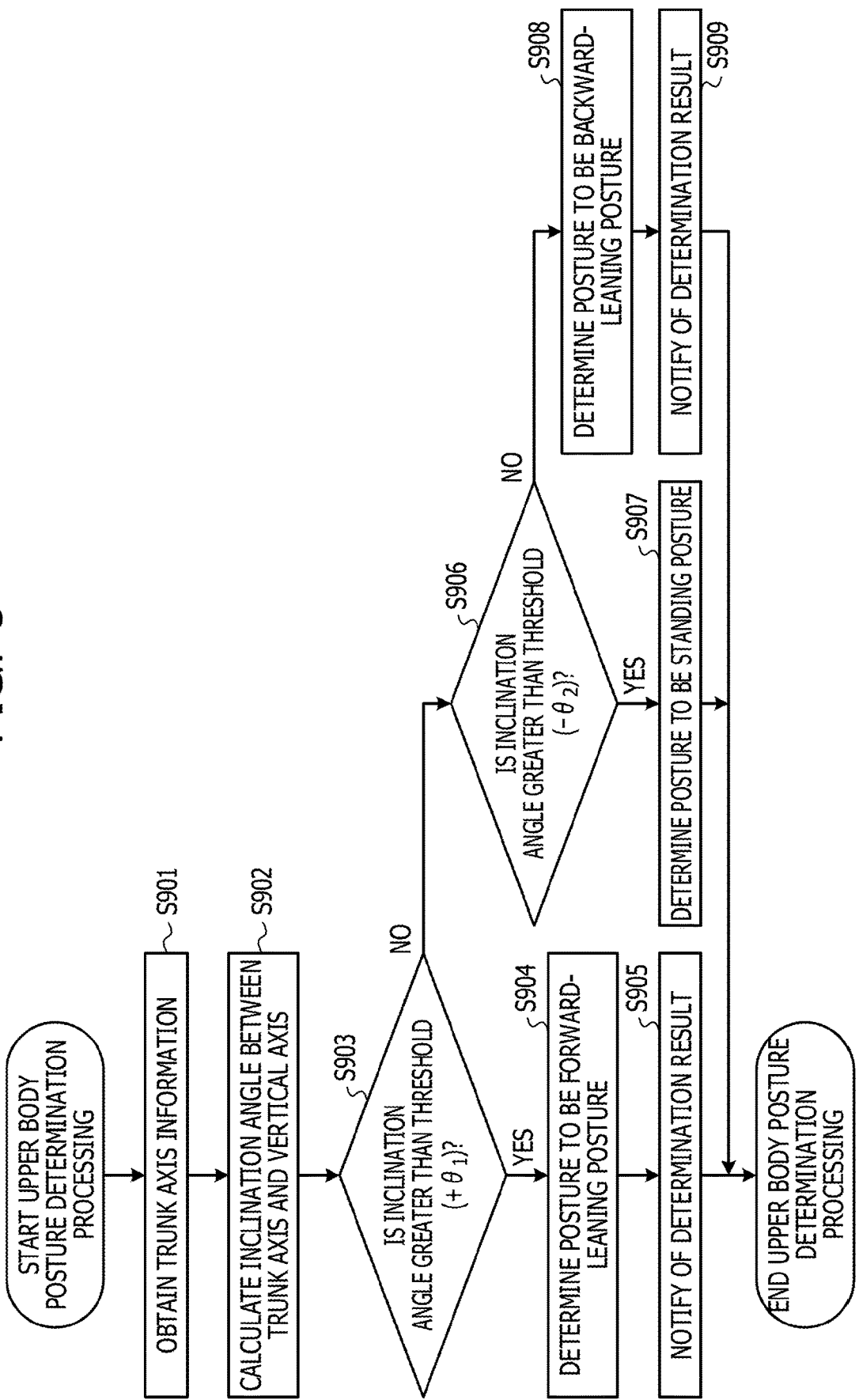
FIG. 9 is a first flowchart of upper body posture determination processing.

Next, the flow of upper body posture determination processing performed by the upper body posture determination unit 807 will be described. FIG. 9 is a first flowchart of the upper body posture determination processing. When the upper body posture determination unit 807 is notified of trunk axis information (for instance, trunk axis information corresponding to time $t_n$) by the trunk axis calculation unit 806, the upper body posture determination processing illustrated in FIG. 9 is started.

In step S901, the upper body posture determination unit 807 obtains trunk axis information corresponding to time $t_n$.

In step S902, the upper body posture determination unit 807 calculates an inclination angle between the trunk axis identified by the trunk axis information and the vertical axis.

In step S903, the upper body posture determination unit 807 determines whether or not the calculated inclination angle is greater than a threshold $(+\theta_1)$. In step S903, when the calculated inclination angle is determined to be greater than the threshold $(+\theta_1)$ (in the case of Yes in step S903), the flow proceeds to step S904.

In step S904, the upper body posture determination unit 807 determines the posture of the person 140 to be a forward leaning posture, and stores a posture determination result in the determination result DB 122 along with the presence or absence of subject.

In step S905, when posture determination results at times $t_{n-2}$, $t_{n-1}$, $t_{n+1}$, and $t_{n+2}$, are not stored in the determination result DB 122, the upper body posture determination unit 807 notifies the trunk axis calculation unit 806 of a posture determination result at time $t_n$.

Thus, the trunk axis calculation unit 806 is able to calculate respective trunk axes based on the body area images at times $t_{n-2}$, $t_{n-1}$, $t_{n+1}$, and $t_{n+2}$, and to notify the upper body posture determination unit 807 of the trunk axis information. Consequently, the upper body posture determination processing illustrated in FIG. 9 is performed again, and the posture of the person 140 at each of the times $t_{n-2}$, $t_{n-1}$, $t_{n+1}$, and $t_{n+2}$, is determined.

On the other hand, when the inclination angle is determined to be less than or equal to the threshold $(+\theta_1)$ in step S903 (in the case of No in step S903), the flow proceeds to step S906.

In step S906, the upper body posture determination unit 807 determines whether or not the inclination angle is greater than a threshold $(-\theta_2)$. When the inclination angle is determined to be greater than the threshold $(-\theta_2)$ in step S906 (in the case of Yes in step S906), the flow proceeds to step S907.

In step S907, the upper body posture determination unit 807 determines the posture of the person 140 to be a standing posture, and stores a posture determination result in the determination result DB 122 along with the presence or absence of subject.

On the other hand, when the inclination angle is determined to be less than or equal to the threshold $(-\theta_2)$ in step S906 (in the case of No in step S906), the flow proceeds to step S908.

In step S908, the upper body posture determination unit 807 determines the posture of the person 140 to be a backward leaning posture, and stores a posture determination result in the determination result DB 122 along with the presence or absence of subject.

In step S909, when posture determination results at times $t_{n-2}$, $t_{n-1}$, $t_{n+1}$, and $t_{n+2}$, are not stored in the determination result DB 122, the upper body posture determination unit 807 notifies the trunk axis calculation unit 806 of a posture determination result at time $t_n$.

Thus, the trunk axis calculation unit 806 is able to calculate respective trunk axes based on the body area images at times $t_{n-2}$, $t_{n-1}$, $t_{n+1}$, and $t_{n+2}$, and to notify the upper body posture determination unit 807 of the trunk axis information. Consequently, the upper body posture determination processing illustrated in FIG. 9 is performed again, and the posture of the person 140 at each of the $t_{n-2}$, $t_{n-1}$, $t_{n+1}$, and $t_{n+2}$, is determined.

As is clear from the above description, the information processing apparatus 120 in the first embodiment detects a body area image corresponding to the body of a person from the image data in each frame included in a captured moving image, detects feature points, and generates a feature point image. In addition, the information processing apparatus 120 in the first embodiment calculates the center of a circle having the locus between pieces of image data of each feature point as an arc, based on multiple feature point images previous and subsequent to a feature point image to be processed. Further, the information processing apparatus 120 in the first embodiment identifies the rotation center of the person 140 based on the calculated circle center, and determines the posture of the person 140 by calculating the inclination angle of the trunk axis of the person 140 using the identified rotation center.

In this manner, in the first embodiment, the rotation center is identified based on the locus of each feature point between pieces of image data in the frames, and the posture of the person 140 is determined. Therefore, according to the first embodiment, even when only the upper body leans forward or backward, it is possible to determine the forward leaning posture or the backward leaning posture of the person with high accuracy.

Second Embodiment

The upper body posture determination unit 807 in the first embodiment determines the posture of the person 140 under the assumption that the person 140 stands with an orientation of right as viewed from the imaging apparatus 110. However, the orientation of the person 140 is not limited to this, and may be right or left as viewed from the imaging apparatus 110.

Thus, in a second embodiment, a case will be described, in which a determination method for the posture of the person 140 is switched according to the orientation of the person 140 standing as viewed from the imaging apparatus 110. The point of difference between the first and second embodiments will be mainly described below.

<Functional Configuration of Posture Determination Unit>

Figure 10:
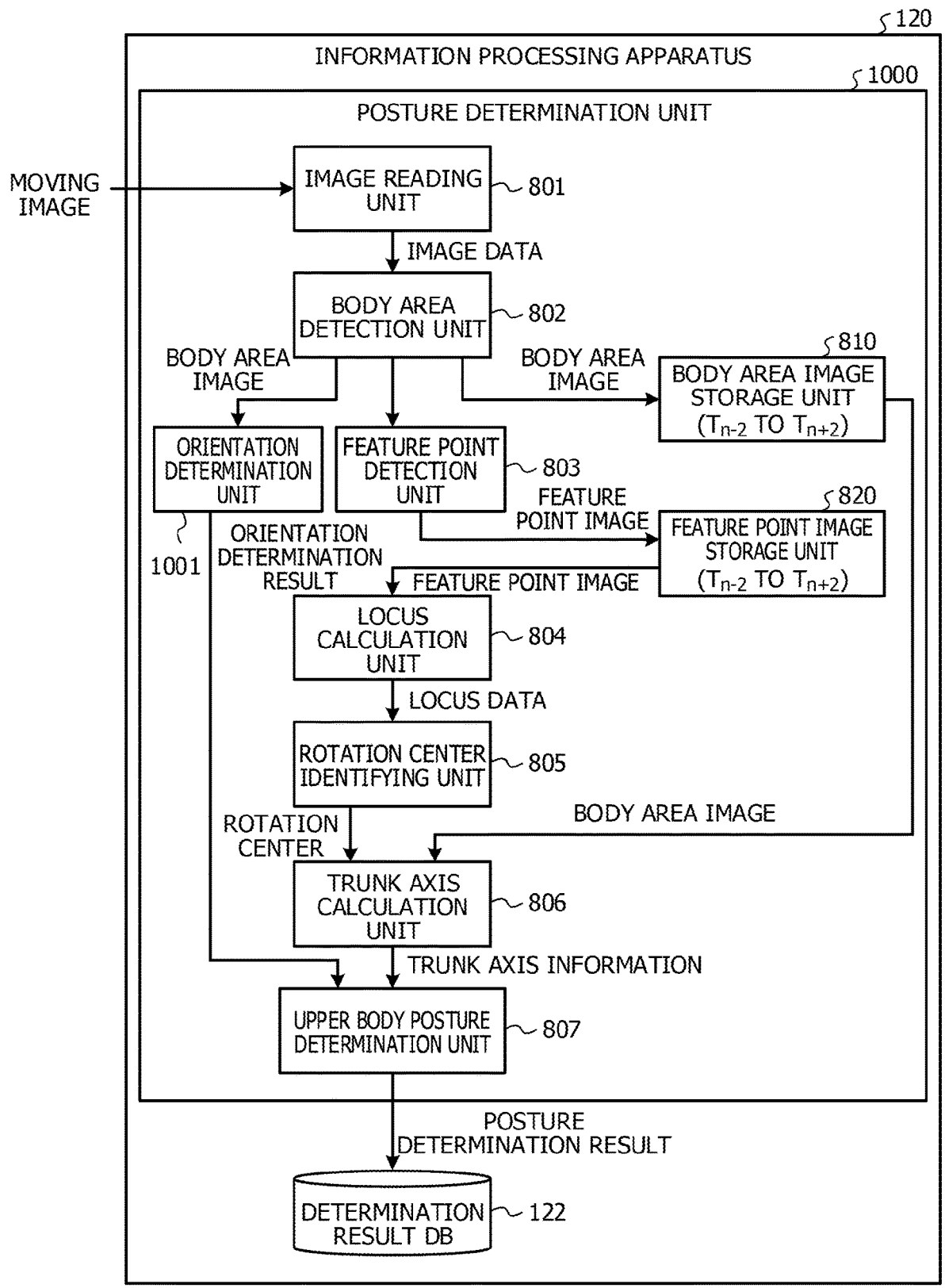
FIG. 10 is a second diagram illustrating an example functional configuration of the posture determination unit.

FIG. 10 is a second diagram illustrating an example functional configuration of the posture determination unit. The point of difference from the functional configuration described using FIG. 8 in the first embodiment is that a posture determination unit 1000 has an orientation determination unit 1001. When receiving a notification of a body area image from the body area detection unit 802, the orientation determination unit 1001 performs matching processing on the body area image with a right-oriented predetermined image pattern and a left-oriented predetermined image pattern, and determines the orientation of the body of the person 140 based on a degree of matching. In addition, the orientation determination unit 1001 notifies the upper body posture determination unit 807 of the determined orientation of the body of the person 140 as an orientation determination result.

The upper body posture determination unit 807 switches between determination methods based on the orientation determination result notified from the direction determination unit 1001, and determines the posture of the person 140.

<Flow of Upper Body Posture Determination Processing>

Figure 11A:
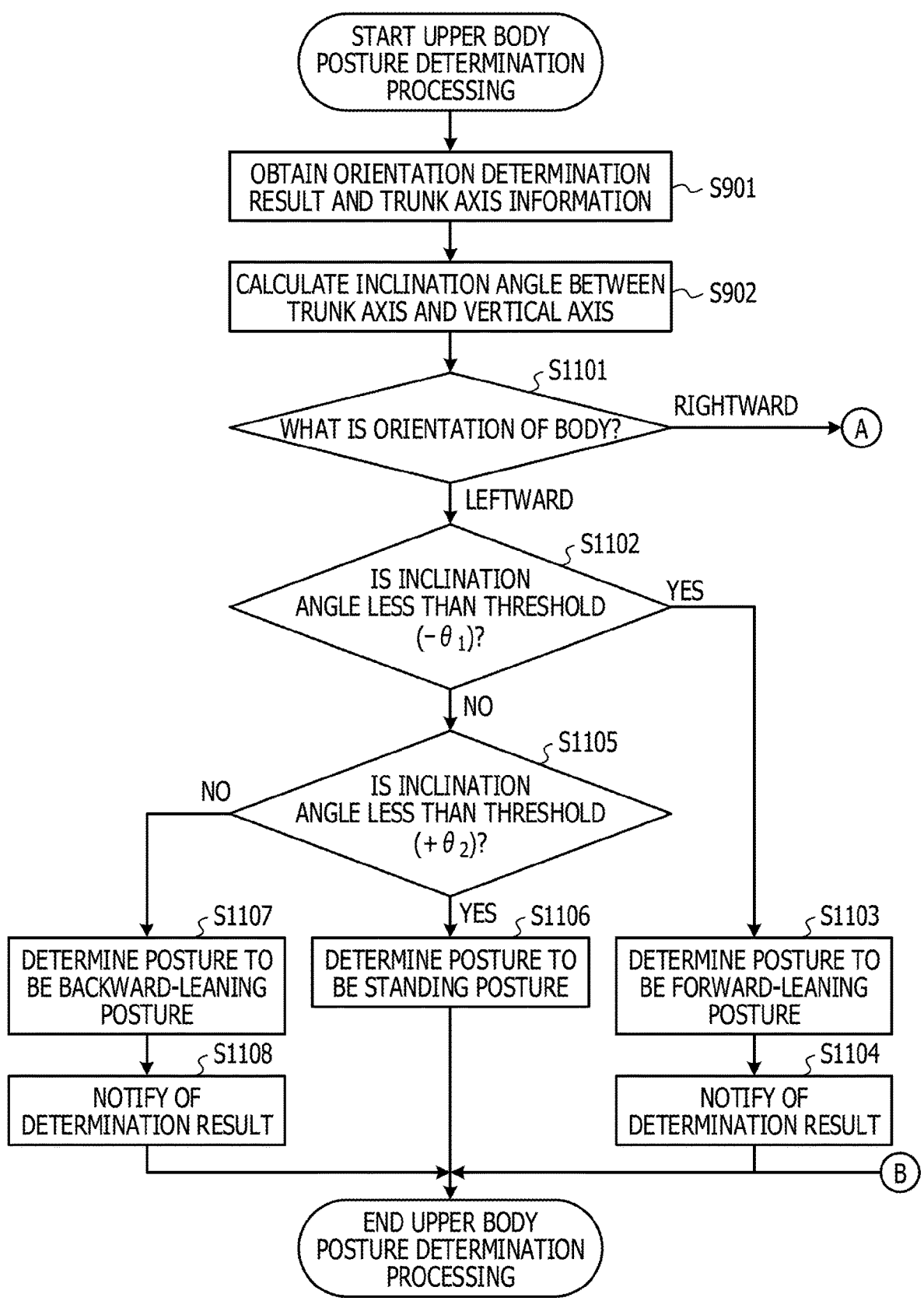
FIGS. 11A and 11B are a second flowchart of the upper body posture determination processing.
Figure 11B:
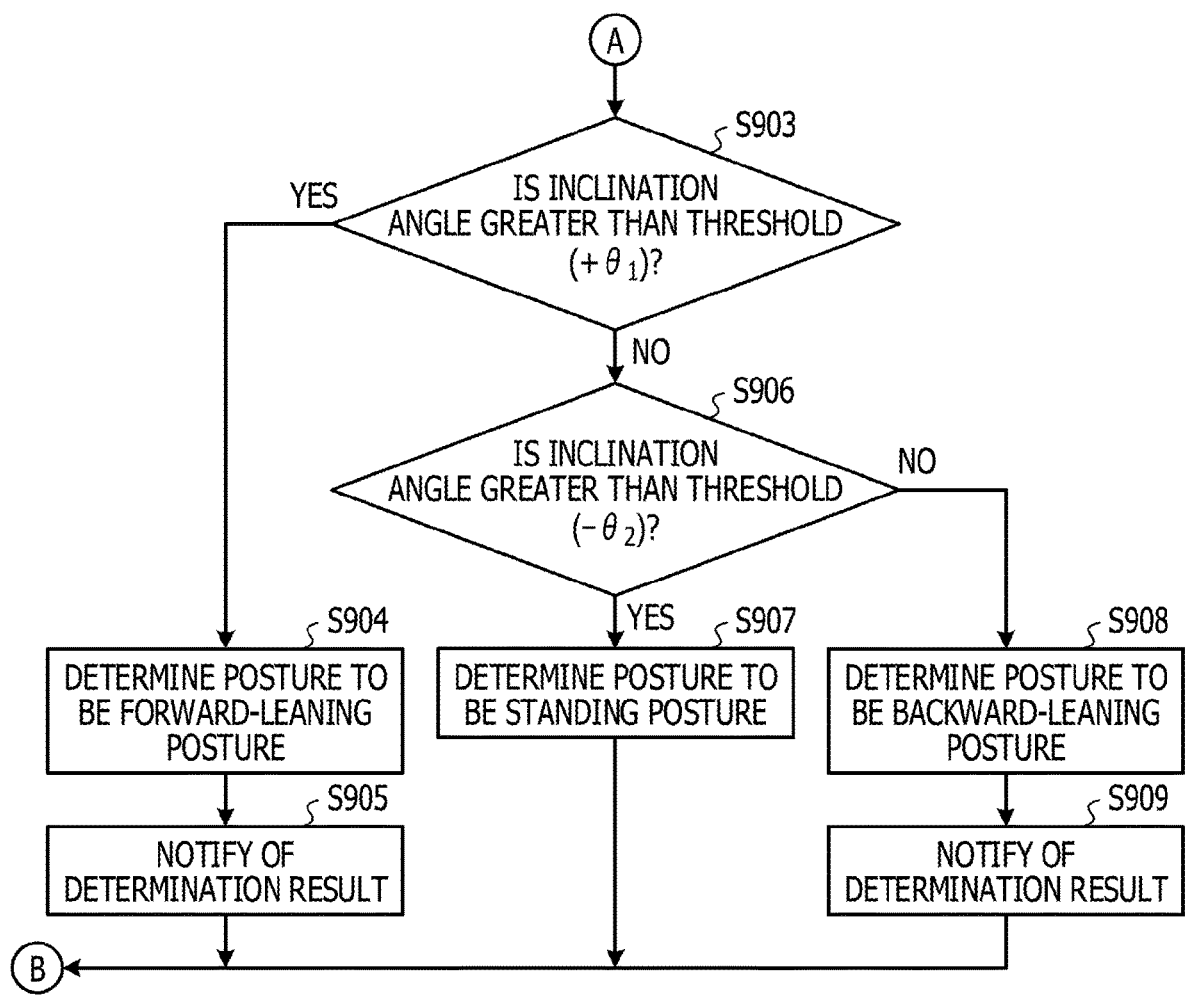

Next, the flow of upper body posture determination processing performed by the upper body posture determination unit 807 will be described. FIGS. 11A and 11B are a second flowchart of the upper body posture determination processing. The point of difference from the flowchart described using FIG. 9 in the first embodiment is steps S1101 to S1108.

In step S1101, the upper body posture determination unit 807 determines the orientation of the body of the person 140 based on the orientation determination result notified from the orientation determination unit 1001. In step S1101, when the orientation of the body of the person 140 is determined to be left, the flow proceeds to step S1102.

In step S1102, the upper body posture determination unit 807 determines whether or not the calculated inclination angle is less than a threshold $(-\theta_1)$. When the calculated inclination angle is determined to be less than a threshold $(-\theta_1)$ in step S1102 (in the case of Yes in step S1102), the flow proceeds to step S1103.

In step S1103, the upper body posture determination unit 807 determines the posture of the person 140 to be a forward leaning posture, and stores a posture determination result in the determination result DB 122 along with the presence or absence of subject.

In step S1104, when posture determination results at times $t_{n-2}$, $t_{n-1}$, $t_{n+1}$, and $t_{n+2}$, are not stored in the determination result DB 122, the upper body posture determination unit 807 notifies the trunk axis calculation unit 806 of a posture determination result at time $t_n$.

Thus, the trunk axis calculation unit 806 is able to calculate respective trunk axes based on the body area images at times $t_{n-2}$, $t_{n-1}$, $t_{n+1}$, and $t_{n+2}$, and to notify the upper body posture determination unit 807 of the trunk axis information. Consequently, the upper body posture determination processing illustrated in FIG. 11 is performed again, and the posture of the person 140 at each of the times $t_{n-2}$, $t_{n-1}$, $t_{n+1}$, and $t_{n+2}$, is determined.

On the other hand, when the inclination angle is determined to be greater than or equal to a threshold $(-\theta_1)$ in step S1102 (in the case of No in step S1102), the flow proceeds to step S1105.

In step S1105, the upper body posture determination unit 807 determines whether or not the inclination angle is less than a threshold $(+\theta_2)$. When the inclination angle is determined to be less than a threshold $(+\theta_2)$ in step S1105 (in the case of Yes in step S1105), the flow proceeds to step S1106.

In step S1106, the upper body posture determination unit 807 determines the posture of the person 140 to be a standing posture, and stores a posture determination result in the determination result DB 122 along with the presence or absence of subject.

On the other hand, when the inclination angle is determined to be greater than or equal to a threshold $(+\theta_2)$ in step S1105 (in the case of No in step S1102), the flow proceeds to step S1107.

In step S1107, the upper body posture determination unit 807 determines the posture of the person 140 to be a backward leaning posture, and stores a posture determination result in the determination result DB 122 along with the presence or absence of subject.

In step S1108, when posture determination results at times $t_{n-2}$, $t_{n-1}$, $t_{n+1}$, and $t_{n+2}$, are not stored in the determination result DB 122, the upper body posture determination unit 807 notifies the trunk axis calculation unit 806 of a posture determination result at time $t_n$.

Thus, the trunk axis calculation unit 806 is able to calculate respective trunk axes based on the body area images at times $t_{n-2}$, $t_{n-1}$, $t_{n+1}$, and $t_{n+2}$, and to notify the upper body posture determination unit 807 of the trunk axis information. Consequently, the upper body posture determination processing illustrated in FIG. 11 is started, and the posture of the person 140 at each of the times $t_{n-2}$, $t_{n-1}$, $t_{n+1}$, and $t_{n+2}$, is determined.

As is clear from the above description, the information processing apparatus 120 in the second embodiment determines the posture of the person 140, and switches between determination methods of determining the posture of the person 140. Consequently, according to the second embodiment, even when only the upper body leans forward or backward, or further even when the orientation of the person 140 is right or left, it is possible to determine the forward leaning posture or the backward leaning posture with high accuracy.

Third Embodiment

In the first and second embodiments, when a trunk axis is calculated by the trunk axis calculation unit 806, the trunk axis has been described as a line which passes through the rotation center, and approximates the body axis points. In contrast, in the third embodiment, in the case where an error (for instance, a least square error) when the body axis points is approximated by a curve passing through the rotation center is smaller than an error when the body axis points is approximated by a line passing through the rotation center, the body axis points is approximated by the curve passing through the rotation center. In addition, in the third embodiment, the posture (round shouldered or normal) of the person 140 is determined by calculating the curvature of the approximation curve. Hereinafter, a point of difference between the third embodiment and the first and second embodiments will be mainly described.

<Specific Example of Processing Performed by Posture Determination Unit>

First, a specific example of processing performed by the posture determination unit 121 will be described, the processing including determining the posture of the person 140, and subsequently determining the state of the person 140. FIGS. 12A and 12B are a chart illustrating a specific example of processing of determining the state of a person performed by the posture determination unit.

Among these, FIG. 12A illustrates the manner in which a parameter (curvature) used for determining the state of the person 140 by disposing body area images 1210, 1220, and 1230 in various cases at time $t_{n-2}$ in a two-dimensional space with the horizontal axis as the X-axis and the vertical axis as the Y-axis.

It is assumed that body axis points 1211 to 1216 are extracted from the body area image 1210 detected based on the image data in the frame at time $t_{n-2}$ with respect to the rotation center 610 identified based on the frame at time $t_n$. In this case, the posture determination unit 121 calculates a line 1241, which passes through the rotation center 610 and approximates the body axis points 1211 to 1216, as an approximate line having a smallest error (for instance, a least square error).

Also, it is assumed that body axis points 1221 to 1226 are extracted from the body area image 1220 detected based on the image data in the frame at time $t_{n-2}$ with respect to the rotation center 610 identified based on the frame at time $t_n$. In this case, the posture determination unit 121 calculates a curve 1251, which passes through the rotation center 610 and approximates the body axis points 1221 to 1226, as an approximate curve having a smallest error (for instance, a least square error).

In addition, it is assumed that body axis points 1231 to 1236 are extracted from the body area image 1230 detected based on the image data in the frame at time $t_{n-2}$ with respect to the rotation center 610 identified based on the frame at time $t_n$. In this case, the posture determination unit 121 calculates a curve 1261, which passes through the rotation center 610 and approximates the body axis points 1231 to 1236, as an approximate curve having a smallest error (a least square error).

FIG. 12B is a chart illustrating a determination method of determining the state of the person 140 based on the calculated approximate curve. As illustrated in FIG. 12B, determination of the state of the person 140 is made based on comparison of a curvature of an approximate curve when calculated with a curvature threshold R under the condition that the rotation center 610 is located at the waist of the person 140. Specifically, when the curvature of the calculated approximate curve is less than the curvature threshold R, the posture determination unit 121 determines that the state of the person 140 is normal. On the other hand, when the curvature of the calculated approximate curve is greater than or equal to the curvature threshold R, the posture determination unit 121 determines that the state of the person 140 is round shouldered. It is to be noted that when an approximate line is calculated, the posture determination unit 121 determines that the state of the person 140 is normal without calculating a curvature.

Let f(x) be an approximate curve, then the curvature k of the approximate curve f(x) is calculated by the following Expression 4.

$$k = \frac{f(x)''(x)}{\sqrt{(1 + f'(x)^2)^3}} \qquad \text{(Expression 4)}$$

In the example of FIG. 12A, when the line 1241 and the curve 1251 are calculated, the posture determination unit 121 determines that the state of the person 140 is normal. On the other hand, when the curve 1261 is calculated, the posture determination unit 121 determines that the state of the person 140 is round shouldered.

<Functional Configuration of Posture Determination Unit>

Figure 13:
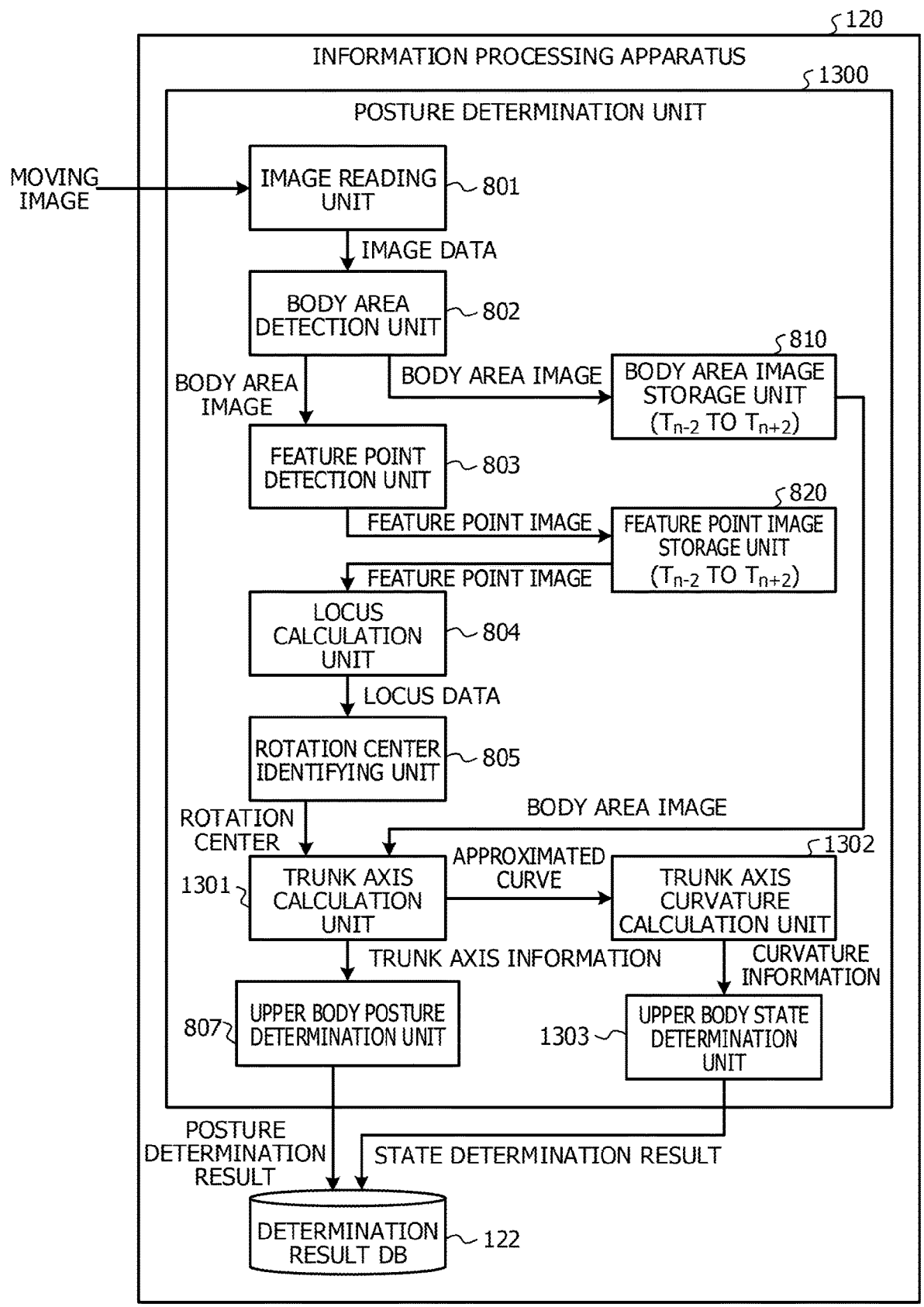
FIG. 13 is a third diagram illustrating an example functional configuration of the posture determination unit.

FIG. 13 is a third diagram illustrating an example functional configuration of the posture determination unit. The point of difference from the functional configuration described using FIG. 8 in the first embodiment is that a posture determination unit 1300 has a trunk axis calculation unit 1301, a trunk axis curvature calculation unit 1302, and an upper body state determination unit 1303.

The trunk axis calculation unit 1301 has the same function as the function of the trunk axis calculation unit 806 in FIG. 8 as well as extracts body axis points using the body area image detected from the image data in the frame at time $t_{n-2}$. In addition, the trunk axis calculation unit 1301 calculates an approximate curve which passes through the rotation center and approximates the extracted body axis points, and notifies the trunk axis curvature calculation unit 1302 of the approximate curve.

The trunk axis curvature calculation unit 1302 calculates the curvature of the approximate curve notified from the trunk axis calculation unit 1301, and notifies the upper body state determination unit 1303 of the curvature as curvature information.

When receiving a notification of the curvature information from the trunk axis curvature calculation unit 1302, the upper body state determination unit 1303 compares the curvature information with the curvature threshold R, thereby determining whether the state of the person 140 is a normal state or a round shouldered state. Also, the upper body state determination unit 1303 stores a state determination result in the determination result DB 122.

<Flow of Upper Body State Determination Processing>

Figure 14:
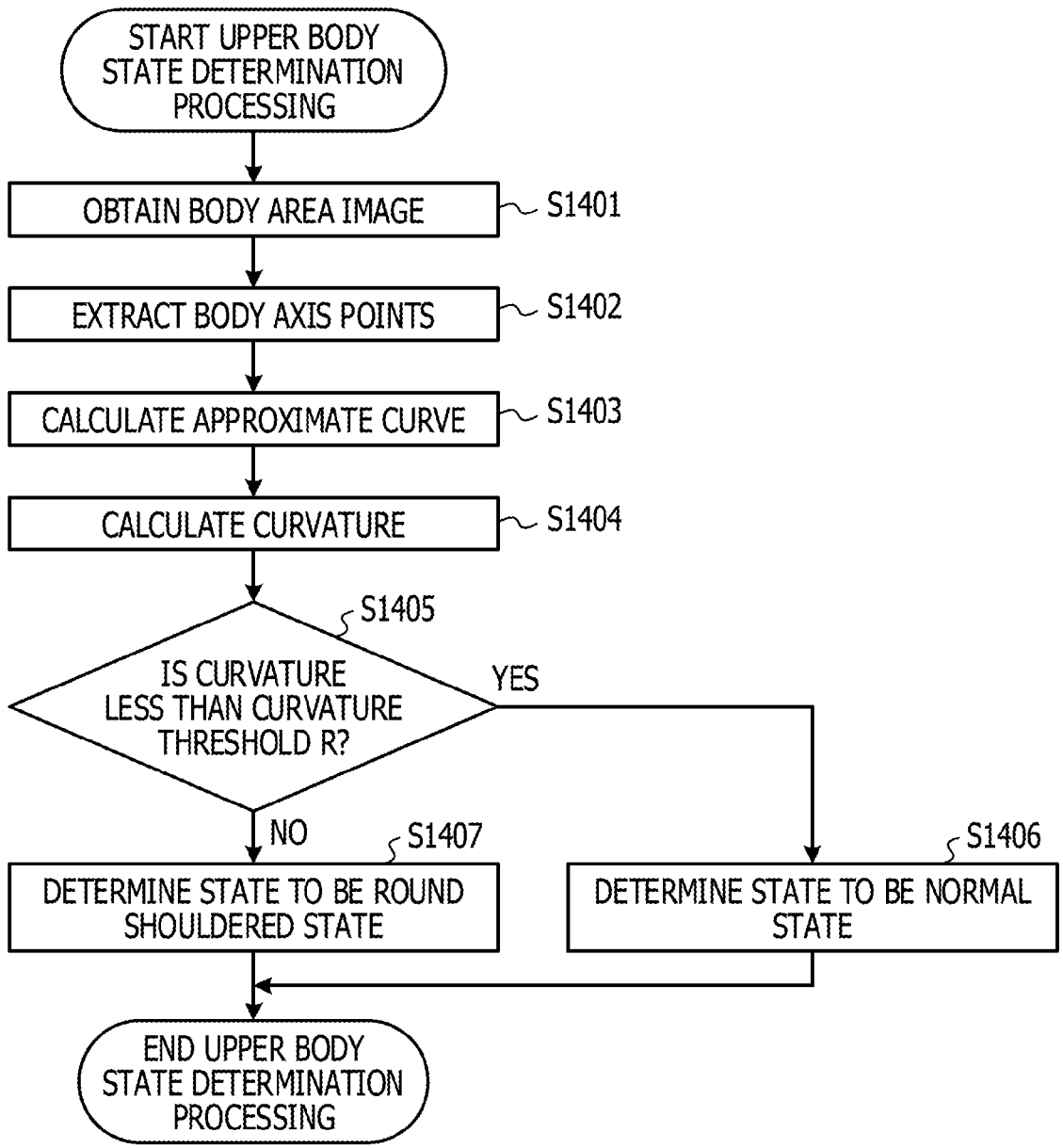
FIG. 14 is a flowchart of the upper body state determination processing.

Next, the flow of upper body state determination processing performed by the trunk axis calculation unit 1301, the trunk axis curvature calculation unit 1302, and the upper body state determination unit 1303 will be described. FIG. 14 is a flowchart of the upper body state determination processing. After the rotation center at time $t_0$ is identified, when the trunk axis calculation unit 1301 is notified of a posture determination result (a forward leaning posture or a backward leaning posture) from the upper body posture determination unit 807, the upper body state determination processing illustrated in FIG. 14 is started.

In step S1401, the trunk axis calculation unit 1301 reads a body area image from the body area image storage unit 810, the body area image being detected from the image data in the frame at time $t_{n-2}$.

In step S1402, the trunk axis calculation unit 1301 extracts body axis points from the read body area image.

In step S1403, the trunk axis calculation unit 1301 calculates an approximate curve which passes through the identified rotation center and approximates the body axis points.

In step S1404, the trunk axis curvature calculation unit 1302 calculates the curvature of the approximate curve calculated in step S1403.

In step S1405, the upper body state determination unit 1303 determines whether or not the curvature calculated in step S1404 is less than the curvature threshold R. When the curvature is determined to be less than the curvature threshold R in step S1405 (in the case of Yes in step S1405), the flow proceeds to step S1406.

In step S1406, the upper body state determination unit 1303 determines that the state of the person 140 is a normal state.

On the other hand, when the curvature is determined to be greater than or equal to the curvature threshold R in step S1405 (in the case of No in step S1405), the flow proceeds to step S1407.

In step S1407, the upper body state determination unit 1303 determines the person 140 is in a round shouldered state.

As is clear from the above description, when the posture of the person 140 is forward leaning or backward leaning, the information processing apparatus 120 in the third embodiment reads one of previous and subsequent body area images. Also, the information processing apparatus 120 in the third embodiment calculates the curvature of an approximate curve which passes through the rotation center in the read body area image and approximates body axis points, thereby determining the state (a round shouldered state or a normal state) of the person 140. Consequently, according to the third embodiment, it is possible to determine the state of the person 140 in addition to the posture of the person 140.

Fourth Embodiment

In the first to third embodiments, the processing has been described, which includes determining the posture (and state) of the person 140, and storing a posture determination result (and a state determination result) in the determination result DB. In contrast, in a fourth embodiment, processing will be described, which includes analyzing the posture determination result (and the state determination result) stored in the determination result DB, and outputting an analysis result. Hereinafter, a point of difference between the fourth embodiment and the first to third embodiments will be mainly described.

Figure 15:
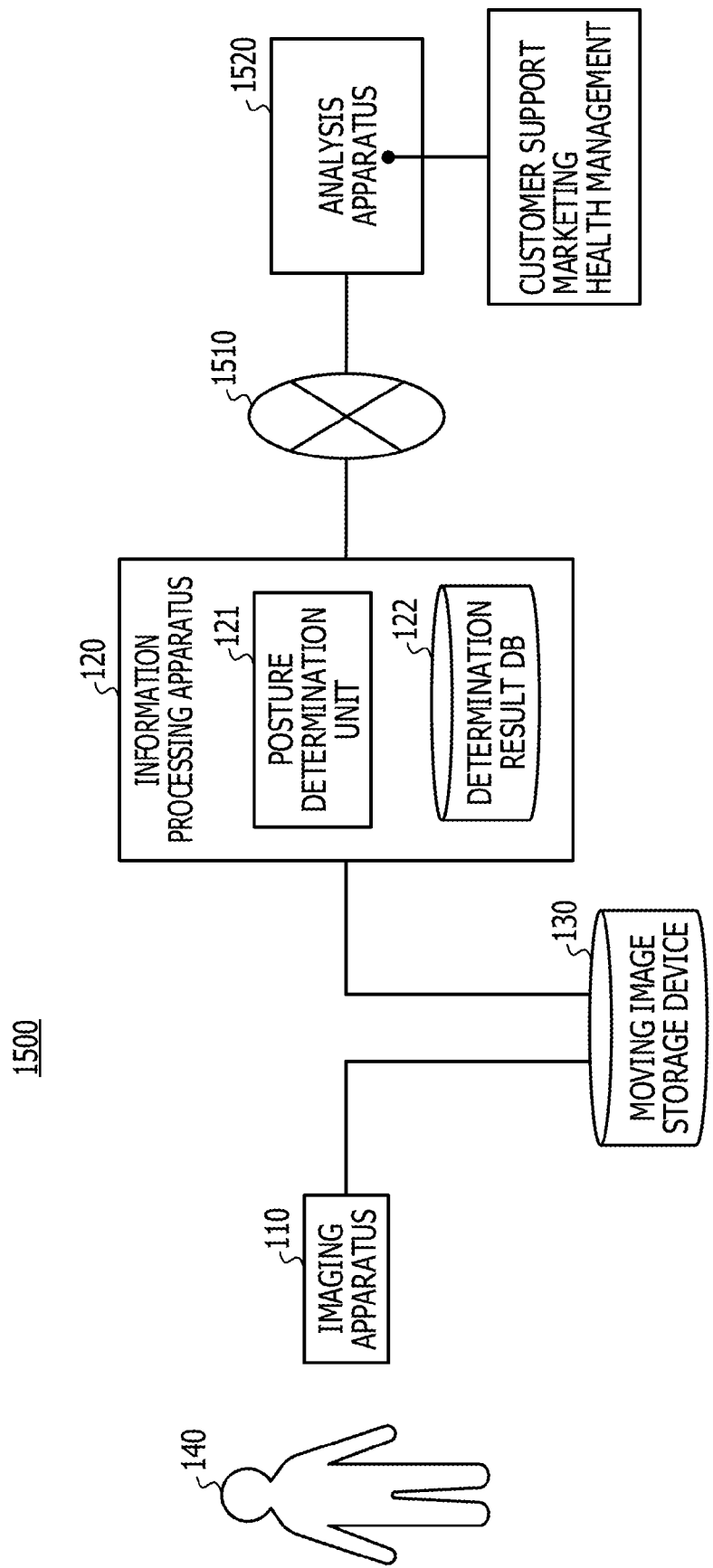
FIG. 15 is a second diagram illustrating an example system configuration of the posture determination system.

FIG. 15 is a second diagram illustrating an example system configuration of the posture determination system. A point of difference from the posture determination system 100 illustrated in FIG. 1 is that an analysis apparatus 1520 is coupled to the information processing apparatus 120 via a network 1510. It is to be noted that in the fourth embodiment, the imaging apparatus 110, the information processing apparatus 120, the moving image storage apparatus 130 are installed, for instance, in a predetermined store.

The analysis apparatus 1520 gains access to the determination result DB 122, and reads determination result information 300 including a posture determination result (and a state determination result). In addition, the analysis apparatus 1520 analyzes the read determination result information 300, and outputs an analysis result.

In the fourth embodiment, the analysis result outputted by the analysis apparatus 1520 includes, for instance, information on customer support, information on marketing, and information on health management.

In the case where the person 140 captured by the imaging apparatus 110 is a customer of the store, and the customer gets interested in a specific product and leans forwardly, the information on customer support refers to information which is for grasping the product in which the customer gets interested and obtained by determining the posture of the customer. In this manner, the analysis apparatus 1520 outputs the information on customer support, thereby making it possible for a store clerk to grasp which customer in the store gets interested in which product.

In the case where the person 140 captured by the imaging apparatus 110 is a customer of the store, and the customer gets interested in a specific product and leans forwardly, the information on marketing refers to information which is aggregated for the products in which the customer gets interested and obtained by determining the posture of the customer. The imaging apparatus 110 is installed in multiple stores, and the analysis apparatus 1520 aggregates posture determination results in all store to output data as the information on marketing, and thus product developers are able to grasp the tendency of products in which the customers get interested and to utilize the information for product development.

In the case where the person 140 captured by the imaging apparatus 110 is an employee of the store, and the employee is in a round shouldered state due to fatigue, the information on health management refers to information which is for grasping a fatigue state of the employee and obtained by determining the posture of the employee. In this manner, the analysis apparatus 1520 outputs the information on health management, thereby making it possible for a supervisor of employees to grasp a fatigue state of each employee and to take measures for health management, such as reviewing working conditions of the employees.

Other Embodiments

In the first and second embodiments, a calculating method for the dashed dotted line 730 passing through the rotation center 610 has not been particularly mentioned. However, for instance, the dashed dotted line 730 may be calculated based on vertical pixels of the image data. Alternatively, the dashed dotted line 730 may be calculated based on a specific subject (artificial object) among the subjects contained in the image data. Alternatively, the dashed dotted line 730 may be calculated based on the body axis of the legs of the person 140 contained in the image data. In either way, a perpendicular direction to the plane on which the person 140 stands is identified in the image data, and the dashed dotted line 730 is to be calculated based on the identified perpendicular direction.

Also, in the first and second embodiments, the case has been described, in which feature points are to be detected from the entire body area image.

However, feature points to be detected are not limited to the entire body area image, and may be detected from, for instance, a partial area corresponding to a specific portion of the body area image. The specific portion referred to herein includes, for instance, the shoulder, and the waist.

Also, in the first and second embodiments, the case has been described, in which the body area image is detected by extracting the person 140 from the image data in the frames. However, the body area image may be detected by deleting the background image from the image data in the frames. The background image referred to herein indicates the image data captured before the person 140 appears in the imaging range.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An information processing apparatus comprising:
a memory; and
a processor coupled to the memory and configured to:
obtain a plurality of images of a person captured at different timings,
detect a feature point of the person from each of the plurality of images,
identify a movement locus of the feature point between the plurality of images,
identify a center position of a circle having the movement locus as an arc, and
when the identified center position corresponds to a waist of a person, determine a posture of the person is a posture in which an upper body of the person is leaning forward based on the identified center position.
2. The information processing apparatus according to claim 1, wherein
the processor is configured to:
identify an inclination, with respect to a vertical direction, of a first portion of the person located above the center position in the plurality of images, and
determine the posture of the person based on the identified the inclination.
3. The information processing apparatus according to claim 2, wherein
the processor is configured to identify a line which approximates a line of gravity of the person, based on the first portion, and
the inclination of the first portion of the person is an inclination of the identified line of gravity with respect to the vertical direction.
4. The information processing apparatus according to claim 3, wherein
the processor is configured to determine, based on the inclination, whether the person is in a forward leaning posture, a backward leaning posture, or a standing posture.
5. The information processing apparatus according to claim 1, wherein
the processor is configured to
determine an orientation of the person, and
switch between determination methods of determining the posture of the person, according to the determined orientation.
6. The information processing apparatus according to claim 1, wherein
the processor is configured to detect the feature point based on a second portion of the person in the plurality of images.
7. The information processing apparatus according to claim 1, wherein
the processor is configured to
identify a curve which approximates a line of gravity of the person, based on the first portion, and
determine the posture of the person based on a curvature of the identified curve.
8. A method executed by a computer, the method comprising:
obtaining a plurality of images of a person captured at different timings;
detecting a feature point of the person from each of the plurality of images;
identifying a movement locus of the feature point between the plurality of images;
identifying a center position of a circle having the movement locus as an arc; and
when the identified center position corresponds to a waist of a person, determining a posture of the person is a posture in which an upper body of the person is leaning forward based on the identified center position.
9. The method according to claim 8, further comprising:
identifying an inclination, with respect to a vertical direction, of a first portion of the person located above the center position in the plurality of images,
wherein the determining of the posture of the person is executed based on the identified the inclination.
10. The method according to claim 9, further comprising:
identifying a line which approximates a line of gravity of the person, based on the first portion, wherein
the inclination of the first portion of the person is an inclination of the identified line of gravity with respect to the vertical direction.

11. The method according to claim 10, further comprising:
    determining, based on the inclination, whether the person is in a forward leaning posture, a backward leaning posture, or a standing posture.

12. The method according to claim 8, further comprising:
    determining an orientation of the person; and
    switching between determination methods of determining the posture of the person, according to the determined orientation.

13. The method according to claim 8, further comprising detecting the feature point based on a second portion of the person in the plurality of images.

14. The method according to claim 8, further comprising:
    identifying a curve which approximates a line of gravity of the person, based on the first portion; and
    determining the posture of the person based on a curvature of the identified curve.

15. A non-transitory computer-readable storage medium storing a program that causes an information processing apparatus to execute a process, the process comprising:
    obtaining a plurality of images of a person captured at different timings;
    detecting a feature point of the person from each of the plurality of images;
    identifying a movement locus of the feature point between the plurality of images;
    identifying a center position of a circle having the movement locus as an arc; and
    when the identified center position corresponds to a waist of a person, determining a posture of the person is a posture in which an upper body of the person is leaning forward based on the identified center position.

16. The non-transitory computer-readable storage medium according to claim 15, the process further comprising:
    identifying an inclination, with respect to a vertical direction, of a first portion of the person located above the center position in the plurality of images,
    wherein the determining of the posture of the person is executed based on the identified the inclination.

17. The non-transitory computer-readable storage medium according to claim 16, the process further comprising:
    identifying a line which approximates a line of gravity of the person, based on the first portion, wherein
    the inclination of the first portion of the person is an inclination of the identified line of gravity with respect to the vertical direction.

18. The non-transitory computer-readable storage medium according to claim 17, the process further comprising:
    determining, based on the inclination, whether the person is in a forward leaning posture, a backward leaning posture, or a standing posture.

* * * * *